(12) United States Patent
Lee et al.

(10) Patent No.: US 12,157,140 B2
(45) Date of Patent: Dec. 3, 2024

(54) MULTI-SLOT DIE COATER

(71) Applicant: LG Energy Solution, Ltd., Seoul (KR)

(72) Inventors: Taek-Soo Lee, Daejeon (KR);
Shin-Wook Jeon, Daejeon (KR);
Sang-Hoon Choy, Daejeon (KR);
Young-Gon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/922,184

(22) PCT Filed: Aug. 11, 2021

(86) PCT No.: PCT/KR2021/010694
§ 371 (c)(1),
(2) Date: Oct. 28, 2022

(87) PCT Pub. No.: WO2022/039440
PCT Pub. Date: Feb. 24, 2022

(65) Prior Publication Data
US 2023/0173529 A1    Jun. 8, 2023

(30) Foreign Application Priority Data

Aug. 20, 2020  (KR) .................. 10-2020-0104884
Aug. 20, 2020  (KR) .................. 10-2020-0104885

(51) Int. Cl.
*B05C 5/02*          (2006.01)
*H01M 4/04*          (2006.01)

(52) U.S. Cl.
CPC ............ *B05C 5/027* (2013.01); *B05C 5/0254* (2013.01); *H01M 4/0404* (2013.01)

(58) Field of Classification Search
CPC ..... B05C 5/027; B05C 5/0254; B05C 5/0262; B05C 9/06; B05C 11/10; B05C 11/1044;
(Continued)

(56) References Cited

U.S. PATENT DOCUMENTS 5,922,408 A * 7/1999 Nakama .................. B05C 9/06
                                                        118/411
7,033,644 B2   4/2006 Tokimasa et al.
(Continued)

FOREIGN PATENT DOCUMENTS

CN       1798616 A     7/2006
CN     101298070 A    11/2008
(Continued)

OTHER PUBLICATIONS

International Search Report for Application No. PCT/KR2021/010694 mailed Nov. 22, 2021, pp. 1-3.
(Continued)

*Primary Examiner* — Yewebdar T Tadesse
(74) *Attorney, Agent, or Firm* — Lerner David LLP

(57) ABSTRACT

There is provided a multi-slot die coater in which a step is formed between rear surfaces of die blocks through a fixing block having a step portion. The fixing block has the step portion of a preset height, and any one die block is coupled to the step portion and the other die block is coupled to the other portion than the step portion, and thus the step is naturally formed between the rear surfaces of the die blocks by the coupling of the die blocks to the fixing block. Thus, it is possible to always maintain the distance of the front ends of the die blocks and the substrate, since the fixing block is fixed between the die blocks, once it is set, the coating gap does not change and is maintained during the process, thereby suppressing the widthwise coating gap deviation.

16 Claims, 26 Drawing Sheets

(58) Field of Classification Search
CPC ....... H01M 4/0404; H01M 4/04; B29C 45/14;
B29C 43/18; B29C 48/16; B29C 64/205;
B29C 48/21; B29C 37/0025; B05D 1/26;
B05D 1/265; B05D 3/12; Y02E 60/10
USPC .................................................. 118/411, 412
See application file for complete search history.

(56) References Cited

U.S. PATENT DOCUMENTS

| | | | |
|---|---|---|---|
| 7,092,855 | B2 | 8/2006 | Wyatt et al. |
| 2003/0157252 | A1 | 8/2003 | Tokimasa et al. |
| 2004/0237886 | A1* | 12/2004 | Meissner ............. B05C 5/0279 |
| | | | 118/506 |
| 2006/0096528 | A1 | 5/2006 | Kawatake et al. |
| 2007/0092655 | A1* | 4/2007 | Tokimasa ............. B05C 5/0254 |
| | | | 118/420 |
| 2008/0274222 | A1 | 11/2008 | Cloeren |
| 2008/0274223 | A1 | 11/2008 | Cloeren |
| 2018/0250701 | A1 | 9/2018 | Kuenne |

FOREIGN PATENT DOCUMENTS

| | | |
|---|---|---|
| CN | 108525940 A | 9/2018 |
| CN | 209718568 U | 12/2019 |
| EP | 3406351 A1 | 11/2018 |
| EP | 3782737 A1 | 2/2021 |
| JP | H08229479 A | 9/1996 |
| JP | 2003200097 A | 7/2003 |
| JP | 2003275652 A | 9/2003 |
| JP | 2004283820 A | 10/2004 |
| KR | 20200035642 A | 4/2020 |
| KR | 20200037662 A | 4/2020 |
| KR | 102151320 B1 | 9/2020 |

OTHER PUBLICATIONS

Search Report dated Jun. 13, 2024 from Office Action for Chinese Application No. 202180029595.1 issued Jun. 19, 2024. 2 pgs.

* cited by examiner

MULTI-SLOT DIE COATER

CROSS-REFERENCE TO RELATED APPLICATIONS

This application is a national phase entry under 35 U.S.C. § 371 of International Application No. PCT/KR2021/010694, filed on Aug. 11, 2021, which claims priority to Korean Patent Application No. 10-2020-0104884 and Korean Patent Application No. 10-2020-0104885, both filed on Aug. 20, 2020, the disclosures of which are incorporated herein by reference.

TECHNICAL FIELD

The present disclosure relates to a multi-slot die coater capable of simultaneously forming two or more layers by wetting, and more particularly, to a multi-slot die coater having a widthwise deviation control means of a coating gap.

BACKGROUND ART

With the increasing technology development and the growing demand for mobile devices, the demand for secondary batteries as an energy source is rapidly increasing, and such secondary batteries essentially include an electrode assembly which is a power generation element. The electrode assembly includes a positive electrode, a separator, and a negative electrode stacked at least once, and the positive electrode and the negative electrode are prepared by coating and drying a positive electrode active material slurry and a negative electrode active material slurry on a current collector made of an aluminum foil and a current collector made of a copper foil, respectively. For the uniform charging/discharging characteristics of the secondary batteries, it is necessary to uniformly coat the positive electrode active material slurry and the negative electrode active material slurry on the current collector, and slot die coaters have been used.

FIG. 1 shows an example of a coating method using the conventional slot die coater.

Referring to FIG. 1, an electrode manufacturing method using the slot die coater includes applying an active material slurry issuing from a slot die coater 30 to a current collector 20 transferred by a coating roll 10. The active material slurry issuing from the slot die coater 30 is applied across one surface of the current collector 20 to form an electrode active material layer. The slot die coater 30 includes two die blocks 31 and 32 and a slot 35 between the two die blocks 31 and 32, and may dispense one type of active material slurry through an exit port 37 in communication with the slot 35 to form a layer of electrode active material. Compared to bar coating or comma coating, the slot die coater achieves high-speed coating, and due to this advantage, it is widely applied from the perspective of high productivity.

To manufacture secondary batteries with high energy density, the thickness of the active material layer which was about 130 µm has gradually increased up to 300 µm. When the thick active material layer is formed with the conventional slot die coater 30, since migration of a binder and a conductive material in the active material slurry deepens during drying, a final electrode is manufactured non-uniformly. To solve this problem, when applying the active material layer at a small thickness and drying and repeating this process thereon, it takes a long time to perform coating twice. To improve both electrode performance and productivity, a dual slot die coater capable of simultaneously applying two types of active material slurries is required.

FIG. 2 is a cross-sectional view of the conventional dual slot die coater along the movement direction (machine direction (MD)) of the current collector 20.

Referring to FIG. 2, the dual slot die coater 40 is configured by assembling three die blocks 41, 42, and 43. Slots are formed between the adjacent die blocks 41, 42 and 43, and accordingly the dual slot die coater 40 includes two slots 45 and 46. Two types of active material slurries are simultaneously distributed on the current collector 20 through exit ports 47 and 48 in communication with the slots 45 and 46, respectively. Two active material layers may be simultaneously formed by continuously applying an additional active material slurry on an active material layer formed by a previously applied active material slurry.

Due to using the active material slurries simultaneously distributed from the different exit ports 47 and 48, the process using the dual slot die coater 40 is quite difficult to form each active material layer to a desired thickness.

The distance G from the exit ports 47, 48 to the current collector 20 surface is a coating gap, and is a very important variable in determining the coating quality of the active material layer. In general, the thickness of each active material layer is affected by the amount of the active material slurry distributed through the exit ports 47, 48, the type of the active material slurry and the coating gap. Additionally, when the coating gap is uniform in the widthwise direction (TD direction) of the current collector, stable coating is achieved, and a widthwise coating gap deviation greatly affects the coating width and noncoated boundary shape. The thickness of the active material layer is very small value of a few tens to a few hundreds of µm, and even a few µm change greatly affects the coating quality, so it is necessary to manage the thickness of the active material layer very strictly, and to stably perform uniform coating in the widthwise direction of the current collector, it is necessary to manage very strictly to achieve uniform dimensional precision in widthwise direction. However, when the dual slot die coater 40 increases in width to use a wide current collector in order to increase the production amount, it is more difficult to achieve uniform coating in the widthwise direction, and accordingly precise control of the coating gap is more necessary.

In addition, an appropriate range of the coating gap is set according to the type of the active material slurry. In the production process, many types of active material slurries, not one type of active material slurry, are used to produce various types of products. It is difficult to provide each dual slot die coater dedicated for each active material slurry to use various types of active material slurries. Accordingly, a type of active material slurry is coated using one dual slot die coater, and after the coating is completed, a different type of active material slurry is coated using the dual slot die coater, and at that time, it is necessary to change the previously set coating gap. In addition, since it is difficult to always uniformly prepare even the same type of active material slurry, there is dispersion in properties depending on when the slurry is prepared, so it is necessary to respond to the dispersion, and as the coating is performed faster, the coating quality deviation increases due to the dispersion of the properties of the active material slurry, and accordingly the coating gap control is more important.

To form a desired coating gap, the conventional art needs to repeat the task of testing the coating process a few times, disassembling and re-assembling each die block, adjusting the coating gap and checking. However, the coating gap is a variable that is adjusted so sensitively that the coating gap changes depending on the fastening strength of bolts used to assemble the die blocks 41, 42, and 43, and may be changed by a force used to pump the active material slurry. Since the slot die coater has the slot on the coupling surface of the die blocks, basically three die blocks 41, 42, and 43 are needed to include the two slots 45 and 46 like the dual slot die coater 40. To configure a device having a foot print and volume similar to the conventional slot die coater 30 including one slot, it is necessary to reduce the thickness of each of the die blocks 41, 42, and 43, and by this reason, inevitably, it is structurally vulnerable to deformation and torsion. When deformation or torsion occurs, the adjusted coating gap is changed, causing defects in the electrode process. Furthermore, this problem will be more serious with the multi-slot die coater having the increased number of die blocks due to including two or more slots.

DISCLOSURE

Technical Problem

The present disclosure is designed to solve the above-described problem, and therefore the present disclosure is directed to providing a multi-slot die coater that is easy to adjust a coating gap and can control a widthwise deviation of the coating gap.

However, the problems to be solved by the present disclosure are not limited to the above problems, and other problems that are not mentioned will be clearly understood by those skilled in the art from the description of the invention described below.

Technical Solution

To solve the above-described problem, a multi-slot die coater according to a configuration of the present disclosure is a multi-slot die coater comprising a lower slot and an upper slot, and the multi-slot die coater comprises a lower die block; an intermediate die block positioned on the lower die block such that the lower slot is formed between the intermediate die block and the lower die block; and an upper die block positioned on the intermediate die block such that the upper slot is formed between the upper die block and the intermediate die block, wherein the lower die block, the intermediate die block and the upper die block include a lower die lip, an intermediate die lip and an upper die lip that form front ends thereof, respectively, the multi-slot die coater further comprises a fixing block on rear surfaces of the die blocks at a side opposite the front end, the fixing block bolted to the rear surfaces of at least two of the die blocks to couple the two die blocks, and the fixing block includes a step portion which protrudes toward the front end with respect to a reference plane in close contact with the rear surface of any one of the two die blocks and the rear surface of the other die block among the two die blocks comes into close contact with the step portion, to form a step between the rear surface of the two die blocks coupled to the fixing block.

According to an aspect of the present disclosure, the fixing block couples the upper die block to the intermediate die block, and the step portion comes into close contact with the rear surface of the upper die block or the rear surface of the intermediate die block.

In this instance, the fixing block may be extended to the rear surface of the lower die block, and thus the fixing block may be also coupled the rear surface of the lower die block.

In another example, the multi-slot die coater may further comprise a flat plate-shaped fixing portion which is bolted to the rear surface of the intermediate die block and the rear surface of the lower die block.

According to another aspect of the present disclosure, the fixing block couples the intermediate die block to the lower die block, and the step portion comes into close contact with the rear surface of the intermediate die block or the rear surface of the lower die block.

In this instance, the fixing block may be extended to the rear surface of the upper die block, and thus the fixing block may be also coupled to the rear surface of the upper die block. In another example, the multi-slot die coater may further comprise a flat plate-shaped fixing portion which is bolted to the rear surface of the upper die block and the rear surface of the intermediate die block.

In a specific example, the fixing block couples the upper die block to the intermediate die block, the step portion comes into close contact with the rear surface of the upper die block, and the upper die block may be shorter in length than the intermediate die block and the lower die block.

The lower die lip, the intermediate die lip and the upper die lip may be disposed on a same straight line.

In another example, a lower exit port in communication with the lower slot is formed between the lower die lip and the intermediate die lip, an upper exit port in communication with the upper slot is formed between the intermediate die lip and the upper die lip, the multi-slot die coater extrudes and coats an active material slurry on a surface of a continuously moving substrate through at least one of the lower slot or the upper slot, and a step is formed between the lower exit port and the upper exit port.

A multi-slot die coater according to another configuration is a dual slot die coater comprising a lower die including a lower slot, and an upper die positioned on the lower die, the upper die including an upper slot, wherein a first flat surface formed on the lower die and a second flat surface formed below the upper die contact each other to form a sliding surface, and the upper die and the lower die are installed such that any one of the upper die and the lower die slides along the sliding surface to make relative movement in a horizontal direction, the multi-slot die coater further comprises a fixing block on rear surfaces on a side opposite a front end of the lower die and the upper die, the fixing block bolted to the rear surfaces of the lower die and the upper die to couple the lower die to the upper die, and the fixing block includes a step portion which protrudes toward the front end with respect to a reference plane in close contact with the rear surface of any one of the lower die and the upper die, and when the rear surface of the other die among the lower die and the upper die comes into close contact with the step portion, a step is formed between the rear surfaces of the lower die and the upper die block coupled to the fixing block.

The lower die may include a lower die block and a first intermediate die block positioned on the lower die block such that a lower slot is formed between the first intermediate die block and the lower die block, and the upper die may include a second intermediate die block installed on the first intermediate die block and an upper die block positioned on the second intermediate die block such that an upper slot is formed between the upper die block and the second intermediate die block.

In this instance, the fixing block may couple the first intermediate die block to the second intermediate die block, and the step portion may come into close contact with the rear surface of the second intermediate die block or the rear surface of the first intermediate die block.

The fixing block may be extended to the rear surface of the lower die block and thus the fixing block may be also coupled to the rear surface of the lower die block.

The fixing block may be extended to the rear surface of the upper die block and thus the fixing block may be also coupled to the rear surface of the upper die block.

The multi-slot die coater may further comprise a flat plate-shaped fixing portion which is bolted to the rear surface of the upper die block and the rear surface of the second intermediate die block or a flat plate-shaped fixing portion which is bolted to the rear surface of the first intermediate die block and the rear surface of the lower die block.

The step portion may come into close contact with the rear surface of the second intermediate die block, and the upper die may be shorter in length than the lower die.

The lower die lip, the first intermediate die lip, the second intermediate die lip and the upper die lip may include a lower die lip, a first intermediate die lip, a second intermediate die lip and an upper die lip that form front ends thereof, respectively, and the lower die lip, the first intermediate die lip, the second intermediate die lip and the upper die lip may be disposed on a same straight line.

The lower die lip, the first intermediate die lip, the second intermediate die lip and the upper die lip may include a lower die lip, a first intermediate die lip, a second intermediate die lip and an upper die lip that form front ends thereof, respectively, a lower exit port in communication with the lower slot may be formed between the lower die lip and the first intermediate die lip, an upper exit port in communication with the upper slot may be formed between the second intermediate die lip and the upper die lip, the multi-slot die coater may extrude and coat an active material slurry on a surface of a continuously moving substrate through at least one of the lower slot or the upper slot, and a step may be formed between the lower exit port and the upper exit port.

In the multi-slot die coaters according to the present disclosure, a plurality of fixing blocks may be provided in a widthwise direction of the multi-slot die coater.

A cross section running across the step portion and the reference plane in the fixing block may include a first cross section portion and a second cross section portion extending perpendicular to the first cross section portion.

The fixing block is not divided into a plurality of components, and may be a monolithic component.

Advantageous Effects

According to a configuration of the present disclosure, the step is formed between the rear surfaces of the die blocks through the fixing block having the step portion. The fixing block has the step portion of the preset height and any one die block is coupled to the step portion and the other die block is coupled to the other portion than the step portion, and thus the step is naturally formed between the rear surfaces of the die blocks by the coupling of the die blocks to the fixing block. Thus, it is possible to always maintain the distance between the front ends of the die blocks and the substrate, i.e., the coating gap at a desired level, and since the fixing block is fixed between the die blocks, once it is set, the coating gap does not change and is maintained during the process, thereby suppressing the widthwise coating gap deviation.

According to another configuration of the present disclosure, the step is formed between the rear surfaces of the upper die and the lower die through the fixing block having the step portion. The fixing block has the step portion of the preset height, and any one die is coupled to the step portion and the other die is coupled to the other portion than the step portion, and thus the step is naturally formed between the rear surfaces of the dies by the coupling of the dies to the fixing block. Thus, it is possible to always maintain the distance between the front ends of the dies and the substrate, i.e., the coating gap at a desired level, and since the fixing block is fixed between the dies, thus once it is set, the coating gap does not change and is maintained during the process, thereby suppressing the widthwise coating gap deviation.

Accordingly, according to the present disclosure, there is no need to dissemble and re-assemble the die blocks which are structurally vulnerable due to their small thickness when adjusting the coating gap, and it is possible to always maintain the uniform coating gap by simple manipulation of coupling the die blocks to the fixing block. In addition, the fixing block can reliably achieve uniform widthwise gap control through the large surface contact of the means such as the block.

According to the present disclosure, it is possible to uniformly control the coating amount and the resultant coating quality by maintaining the uniform (±2%) coating gap considering the deformation of the die block by the pressure of the active material slurry coming out. Accordingly, it is possible to obtain coated products, in particular, electrodes for secondary batteries, with uniform quality by using the multi-slot die coater having the uniform coating gap.

As described above, according to the present disclosure, even if the pressure of the active material slurry coming out increases, it is possible to maintain the coating gap once it is adjusted, despite the use of the thin die blocks. It is possible to ensure coating workability and reproducibility.

Using the multi-slot die coater, it is possible to uniformly form a coating layer, in particular, an active material layer, to a desired thickness, and preferably, it is possible to simultaneously coat two or more types of active material slurries, thereby improving the performance and productivity.

According to the present disclosure, a plurality of fixing blocks having the step portion may be provided in the widthwise direction of the multi-slot die coater. Thus, it is possible to achieve precise control without widthwise coating gap deviation. Accordingly, it is possible to manage with uniform dimensional precision to stably perform uniform coating in the widthwise direction on the wide current collector.

An appropriate range of the coating gap may be set according to the type of the active material slurry. The present disclosure provides different types of fixing blocks having the step portion of the suitable height and performs the process by replacing the fixing block necessary for each production process, and thus it is possible to use the multi-slot die coater for general purpose without including each multi-slot die coater dedicated to each active material slurry to use various types of active material slurries. Additionally, when there is dispersion in the active material slurry, it is possible to quickly respond to the dispersion by immediately replacing only the fixing block and adjusting the coating gap.

As described above, when the multi-slot die coater of the present disclosure is used to manufacture an electrode of a secondary battery by coating an active material slurry on a current collector moving at a high speed, it is possible to achieve uniform coating under high-speed or wide-scale coating conditions.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
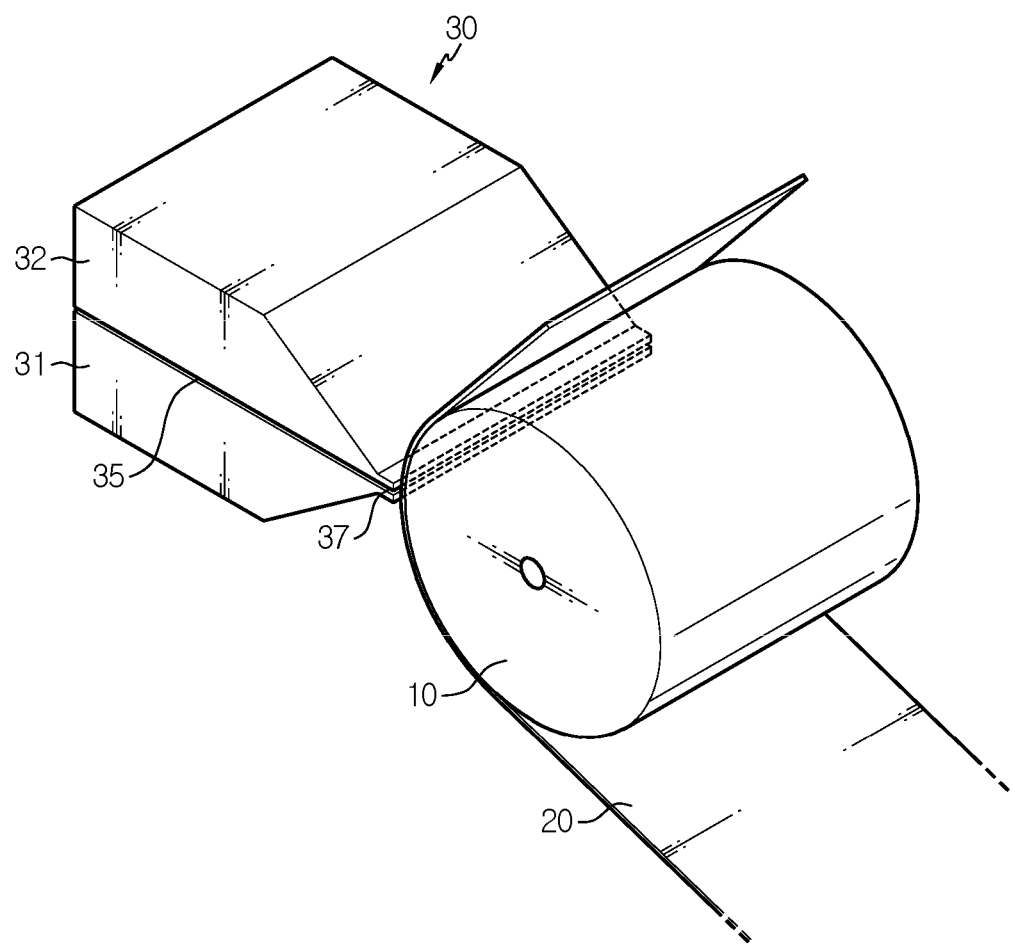
FIG. 1 is a schematic diagram showing an example of using a slot die coater according to the conventional art.
Figure 2:
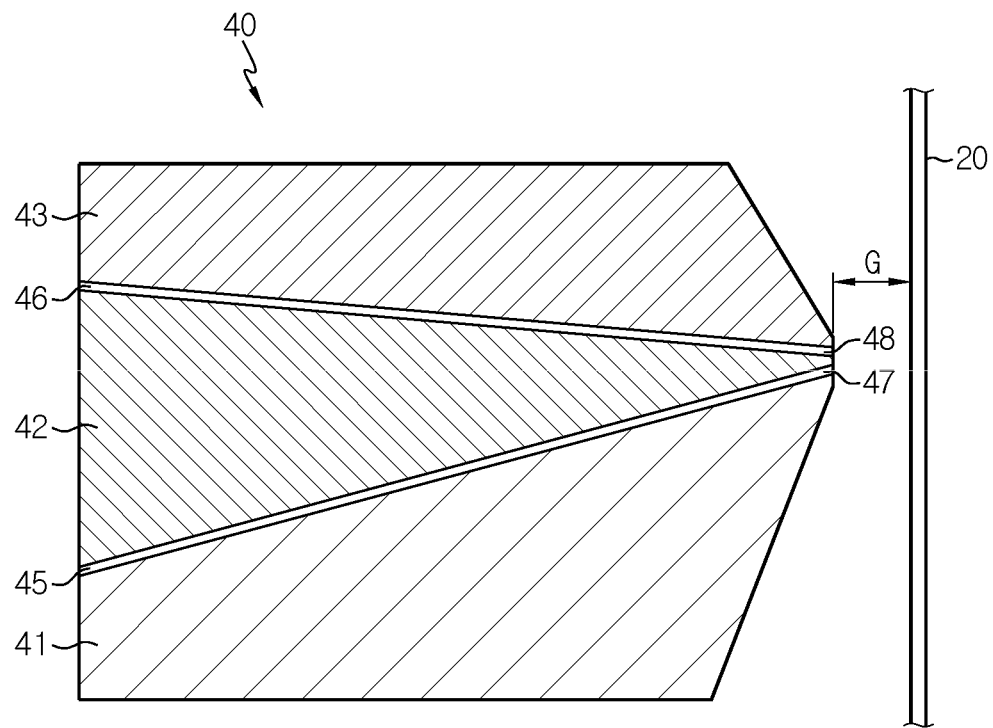
FIG. 2 is a cross-sectional view of a dual slot die coater according to the conventional art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just some preferred embodiments of the present disclosure and do not fully describe the technical features of the present disclosure, so it should be understood that a variety of other equivalents and modifications could have been made thereto at the time of filing the patent application.

A multi-slot die coater of the present disclosure may include two or more slots. Basically, the multi-slot die coater is an apparatus including a lower slot and an upper slot to coat a coating solution in a double layer on a substrate. The 'substrate' described below is a current collector and the coating solution is an 'active material slurry'. Both a first coating solution and a second coating solution are active material slurries, and they may have the same or different compositions (types of an active material, a conductive material, and a binder), contents (an amount of each of the active material, the conductive material, and the binder) or properties. The multi-slot die coater of the present disclosure is optimal for electrodes manufactured by coating by applying at least two types of active material slurries simultaneously or by pattern coating by applying at least two types of active material slurries alternately. However, the scope of the present disclosure is not necessarily limited thereto. For example, the substrate may be a porous base that constitutes a separator, and the first coating solution and the second coating solution may be organics having different compositions or properties. That is, in case that thin film coating is required, the substrate, the first coating solution and the second coating solution are not limited to particular types.

Figure 3:
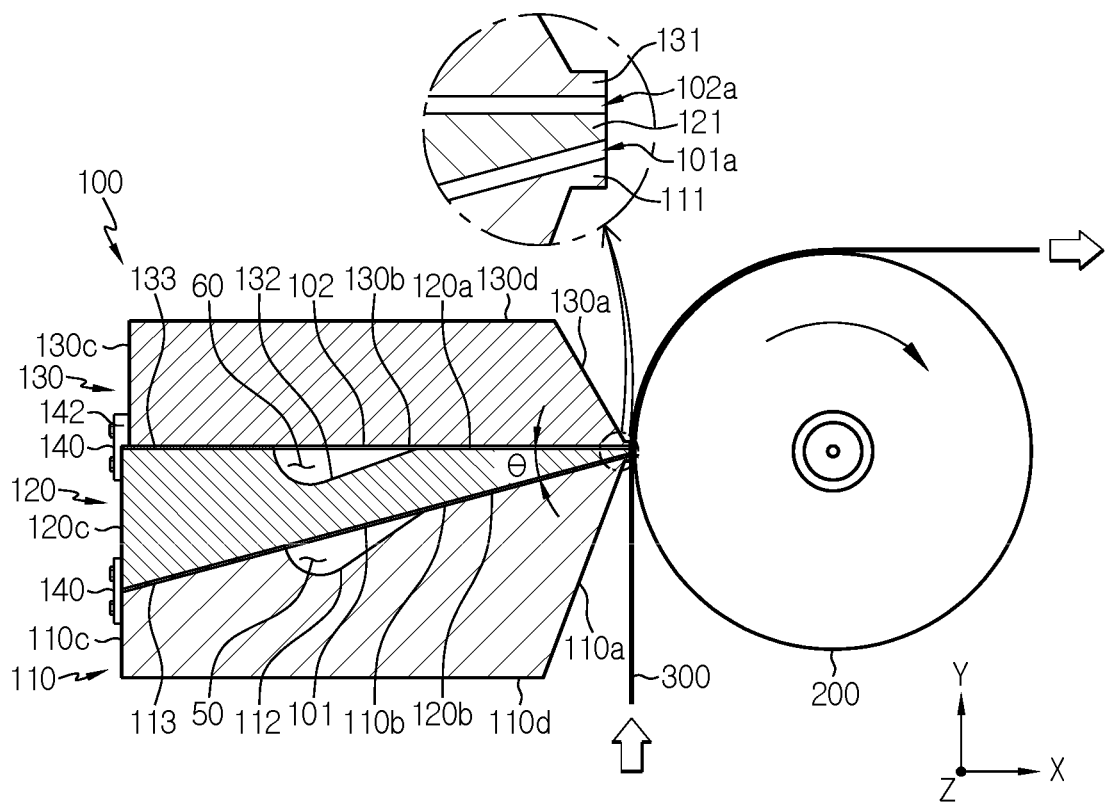
FIG. 3 is a schematic cross-sectional view of a multi-slot die coater according to an embodiment of the present disclosure.
Figure 4:
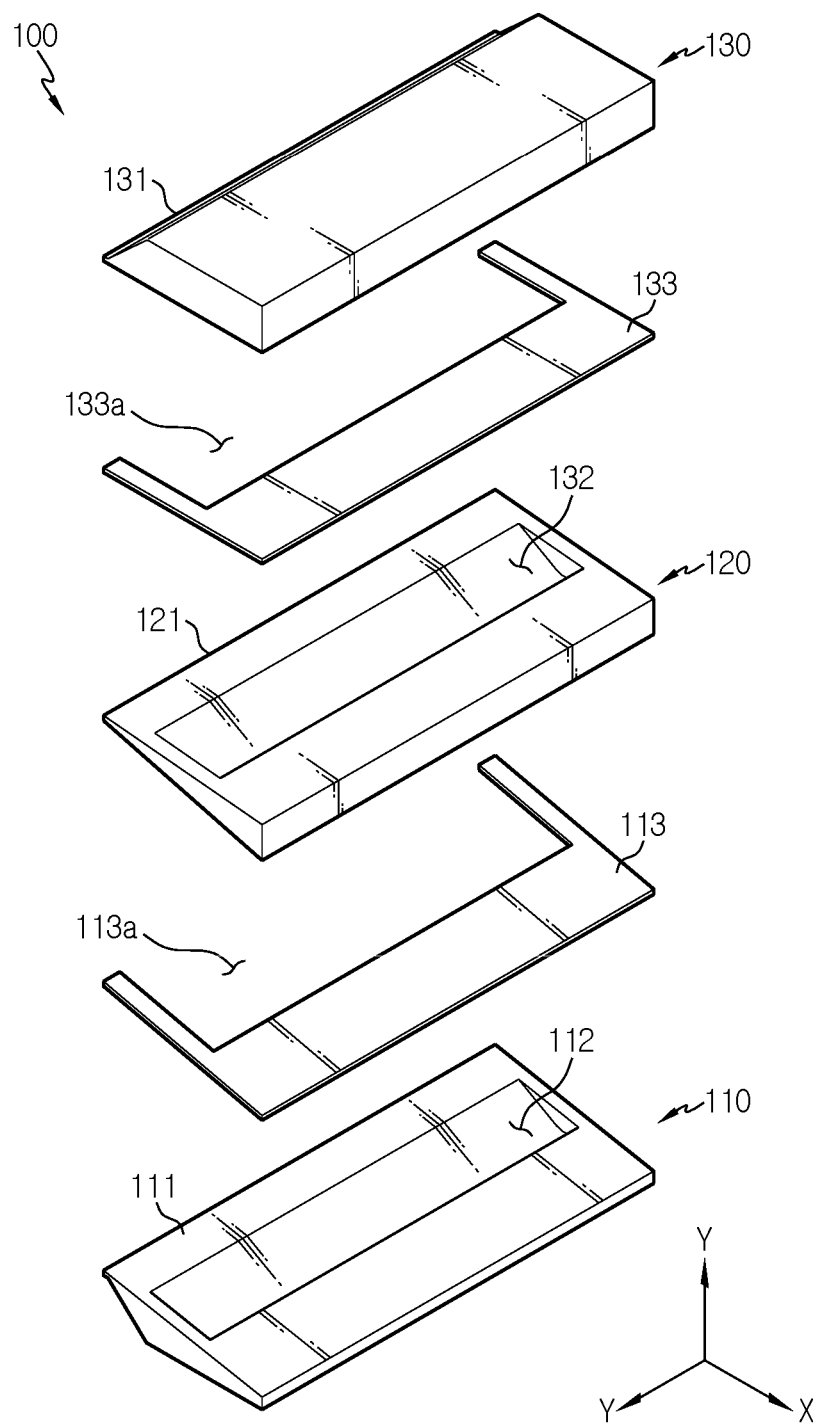
FIG. 4 is a schematic exploded perspective view of a multi-slot die coater according to an embodiment of the present disclosure.
Figure 5:
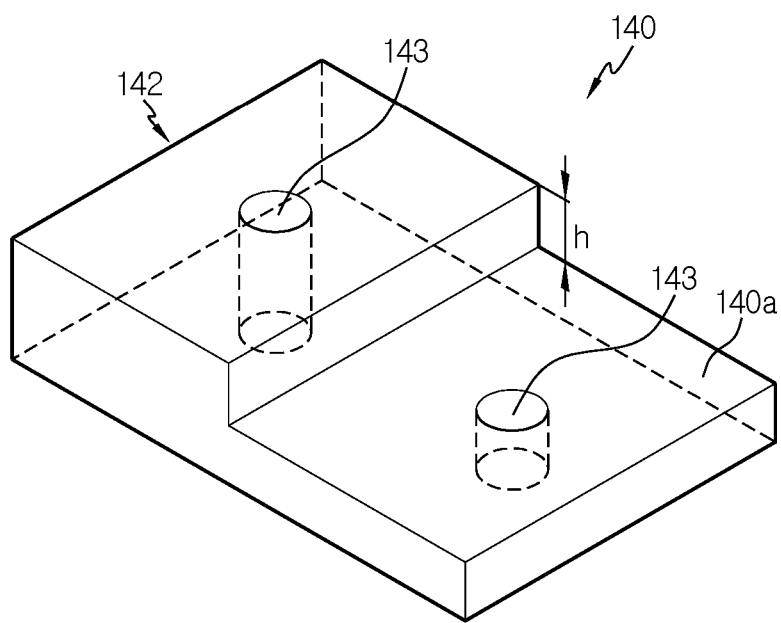
FIG. 5 is a perspective view of a fixing block included in the multi-slot die coater shown in FIG. 3.
Figure 6:
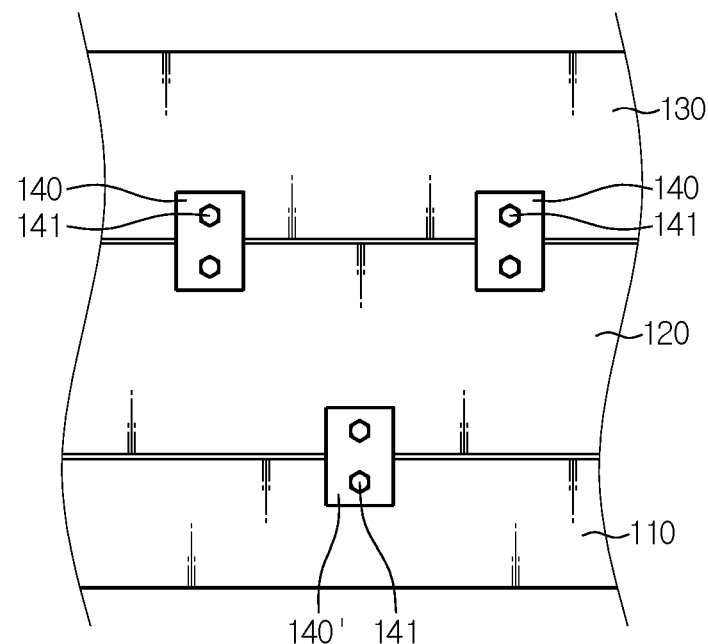
FIG. 6 is a rear view of a multi-slot die coater according to an embodiment of the present disclosure.

FIG. 3 is a schematic cross-sectional view of the multi-slot die coater according to an embodiment of the present disclosure. FIG. 4 is a schematic exploded perspective view of the multi-slot die coater according to an embodiment of the present disclosure. FIG. 5 is a perspective view of a fixing block included in the multi-slot die coater shown in FIG. 3. FIG. 6 is a rear view of the multi-slot die coater according to an embodiment of the present disclosure.

The multi-slot die coater 100 according to an embodiment of the present disclosure is a dual slot die coater including a lower slot 101 and an upper slot 102, and is an apparatus capable of simultaneously or alternately coating a same type of coating solution or two different types of coating solutions on a substrate 300 through the lower slot 101 and the upper slot 102. Referring to FIGS. 3 and 4, the multi-slot die coater 100 includes a lower die block 110, an intermediate die block 120 positioned on the lower die block 110, and an upper die block 130 positioned on the intermediate die block 120.

In FIG. 3, the multi-slot die coater 100 is installed such that a direction in which the coating solution or the active material slurry emerges is almost horizontally (in an X direction) (approximately: ±5°).

The intermediate die block 120 is a block disposed in the middle of the blocks of the multi-slot die coater 100, and is a block interposed between the lower die block 110 and the upper die block 130 to form a multi-slot. The intermediate die block 120 of this embodiment is a right triangle in cross section, but its shape is not necessarily limited thereto, and for example, the intermediate die block 120 may be an isosceles triangle in cross section.

A first surface 120a where the intermediate die block 120 is in contact with the upper die block 130 is placed almost horizontally, and a surface 130d (that is, a surface that forms the upper surface of the outer peripheral surface of the multi-slot die coater 100) opposite a surface 130b where the upper die block 130 faces the first surface 120a is also placed almost horizontally. As described above, the first surface 120a and the opposite surface 130d are almost parallel to each other. Additionally, a surface 110d (that is, a surface that forms the lower surface of the outer peripheral surface of the multi-slot die coater 100) opposite a surface 110b where the lower die block 110 is in contact with the intermediate die block 120 is also placed almost horizontally, and this surface is a bottom surface 110d (X-Z plane).

The surfaces of the lower die block 110, the intermediate die block 120 and the upper die block 130 opposite the direction in which the active material slurry emerges, i.e., rear surfaces 110c, 120c, and 130c, are placed almost vertically (Y direction).

Among the surfaces that form the outer peripheral surface of the multi-slot die coater 100 in the lower die block 110 and the upper die block 130 on the outermost side, the bottom surface 110d of the lower die block 110 and the top surface 130d of the upper die block 130 may be almost perpendicular to the rear surfaces 110c and 130c. Additionally, the first surface 120a of the intermediate die block 120 may be almost perpendicular to the rear surface 120c. In the die blocks 110, 120, and 130, since corners at which sides meet are right-angled, a right angle portion in cross section exists, and a vertical or horizontal surface may be used as a reference surface, and thus it is easy to manufacture or handle and it is possible to ensure precision. In addition, when combined together, the lower die block 110, the intermediate die block 120 and the upper die block 130 have approximately a rectangular parallelepiped shape as a whole, and is inclined toward the substrate 300 only at the front side where the coating solution emerges (see the surface 130a of the upper die block 130, the surface 110a of the lower die block 110). The shape after assembly is approximately similar to that of a slot die coater including a single slot (for example, 30 of FIG. 1), so it is possible to share a slot die coater stand or the like.

The lower die block 110, the intermediate die block 120 and the upper die block 130 are not necessarily limited thereto, and for example, may be configured as a vertical die such that the direction in which the electrode active material slurry emerges is an upper direction and the rear surfaces 110c, 120c, and 130c are bottom surfaces.

The die blocks 110, 120, and 130 are made of, for example, a SUS material. Materials that are easy to process, such as SUS420J2, SUS630, SUS440C, SUS304, and SUS316L, may be used. The SUS is easy to process, inexpensive, has high corrosion resistance, and can be formed in a desired shape at low cost.

The lower die block 110 is the lowermost block among the blocks of the multi-slot die coater 100, and the surface 110b facing the intermediate die block 120 is inclined at an angle of approximately 20° to 60° with respect to the bottom surface 110d.

The lower slot 101 may be formed at a location in which the lower die block 110 and the intermediate die block 120 are in contact with each other. For example, a first spacer 113 is interposed between the lower die block 110 and the intermediate die block 120 to form a gap between, and the lower slot 101 corresponding to a passage through which the first coating solution 50 may flow may be formed. In this case, the thickness of the first spacer 113 determines the vertical width (Y-axis direction, the slot gap) of the lower slot 101.

As shown in FIG. 4, the first spacer 113 has a first opening portion 113a which is cut at an area, and may be interposed in the remaining portion except one side in the edge area of the facing surface of each of the lower die block 110 and the intermediate die block 120. Accordingly, a lower exit port 101a through which the first coating solution 50 emerges is only formed between the front end of the lower die block 110 and the front end of the intermediate die block 120. The front end of the lower die block 110 and the front end of the intermediate die block 120 are defined as a lower die lip 111 and an intermediate die lip 121, respectively, and in other words, the lower exit port 101a is formed at the spacing between the lower die lip 111 and the intermediate die lip 121.

For reference, the first spacer 113 acts as a gasket to prevent the leakage of the first coating solution 50 through the gap between the lower die block 110 and the intermediate die block 120 except the area where the lower exit port 101a is formed, and thus the first spacer 113 is preferably made of a material having sealing ability.

The lower die block 110 includes a first manifold 112 having a predetermined depth on the surface 110b facing the intermediate die block 120, and the first manifold 112 is in communication with the lower slot 101. The first manifold 112 is a space formed from the surface 110b where the lower die block 110 is in contact with the intermediate die block 120 to the surface 110d opposite the surface 110b. The first manifold 112 is connected to a first coating solution supply chamber (not shown) installed outside with a supply pipe and is supplied with the first coating solution 50. When the first manifold 112 is fully filled with the first coating solution 50, the flow of the first coating solution 50 is guided along the lower slot 101 and comes out of the lower exit port 101a.

The upper die block 130 is positioned in contact with the first surface 120a which is the upper surface of the intermediate die block 120 in parallel to the bottom surface. As described above, the upper slot 102 is formed at a location in which the intermediate die block 120 and the upper die block 130 are in contact with each other.

In the same way as the lower slot 101 described above, a second spacer 133 may be interposed between the intermediate die block 120 and the upper die block 130 to form a gap between. Accordingly, the upper slot 102 corresponding to a passage through which a second coating solution 60 may flow is formed. In this case, a vertical width (Y-axis direction, the slot gap) of the upper slot 102 is determined by the second spacer 133.

In addition, in the similar way to the first spacer 113, the second spacer 133 has a second opening portion 133a which is cut at an area, and may be interposed in the remaining portion except one side in the edge area of the facing surface of each of the intermediate die block 120 and the upper die block 130. Likewise, the circumferential direction except the front side of the upper slot 102 is blocked, and the upper exit port 102a is only formed between the front end of the intermediate die block 120 and the front end of the upper die block 130. The front end of the upper die block 130 is defined as a lower die lip 131, and in other words, the upper exit port 102a is formed at the spacing between the intermediate die lip 121 and the upper die lip 131.

In addition, the intermediate die block 120 includes a second manifold 132 having a predetermined depth on the surface 120a facing the upper die block 130 and the second manifold 132 is in communication with the upper slot 102. The intermediate die block 120 has a second surface 120b opposite the first surface 120a. The second surface 120b is a surface where the intermediate die block 120 is in contact with the lower die block 110. The second manifold 132 is a space provided from the first surface 120a to the second surface 120b. Although not shown in the drawings, the second manifold 132 is connected to a supply chamber of the second coating solution 60 installed outside with a supply pipe and is supplied with the second coating solution 60. When the second coating solution 60 is supplied from the external source along the supply pipe, and the second manifold 132 is fully filled with the second coating solution 60, the flow of the second coating solution 60 is guided along the upper slot 102 in communication with the second manifold 132 and comes out of the upper exit port 102a.

The upper slot 102 and the lower slot 101 form an angle, and the angle may be approximately 20° to 70°. The upper slot 102 and the lower slot 101 may intersect at one point, and the upper exit port 102a and the lower exit port 101a may be provided near the intersection point. Accordingly, the locations at which the first coating solution 50 and the second coating solution 60 emerge may be concentrated on approximately one point.

Meanwhile, an angle θ between the first surface 120a where the intermediate die block 120 is in contact with the upper die block 130 and the second surface 120b where the intermediate die block 120 is in contact with the lower die block 110 is preferably in the range in which a turbulence is not formed immediately after the active material slurry issuing through the upper exit port 102a and the active material slurry issuing through the lower exit port 101a emerge out at the same time. When the angle θ is too small, the intermediate die block 120 is too thin and very vulnerable to deformation and twist.

According to the multi-slot die coater 100 having such a configuration, a rotatable coating roll 200 is positioned on the front side of the multi-slot die coater 100, and the coating roll 200 may be rotated to move the substrate 300 to be coated, while continuously contacting the first coating solution 50 and the second coating solution 60 with the surface of the substrate 300, and thereby the substrate 300 may be coated in a double layer. Alternatively, pattern coating may be intermittently formed on the substrate 300 by performing the supply and stop of the first coating solution 50 and the supply and stop of the second coating solution 60 in an alternating manner.

Here, the multi-slot die coater further includes a fixing block 140 on the rear surface 110c, 120c, 130c of the die blocks 110, 120, 130 on the side opposite the front end, and the fixing block 140 is fastened to the rear surfaces of at least two of the die blocks 110, 120, 130 using a bolt 141 to couple the two die blocks. The fixing block 140 includes a step portion 142 that protrudes toward the front end with respect to the reference plane in close contact with the rear surface of any one of the two die blocks, and the rear surface of the other die block comes into close contact with the step portion 142, to form a step between the rear surfaces of the two die blocks coupled to the fixing block 140.

As shown in FIG. 5, the fixing block 140 has the reference plane 140a in close contact with the rear surface of any one of the two die blocks, in this embodiment, the rear surface 120c of the intermediate die block 120. Additionally, the fixing block 140 has the step portion 142 that protrudes toward the front end with respect to the reference plane 140a. The height of the step portion 142 is defined as the height h from the reference plane 140a. The fixing block 140 may further include a hole 143 through which the bolt 141 passes to fasten the bolt 141. The number and position of the hole 143 may be changed as shown. A cross section running across the step portion 142 and the reference plane 140a in the fixing block 140 may include a first cross section portion and a second cross section portion extending perpendicular to the first cross section portion. For example, the cross section of the fixing block 140 has a '¬' shape or 'L' shape. This simple block shape does not make processing complex, and achieves precise processing. Additionally, in the same way as the die blocks 110, 120, 130, also in the fixing block 140, since corners at which sides meet are right-angled, a right angle portion in cross section exists, and a vertical or horizontal plane may be used as a reference plane, and thus it is easy to manufacture or handle and it is possible to ensure precision. Additionally, when the lower die block 110, the intermediate die block 120 and the upper die block 130 are combined together and the fixing block 140 is fastened, the contacted portions may be supported each other with high surface contact, and thus it is very good to fasten and fix and maintain.

In particular, in this embodiment, the first surface 120a where the intermediate die block 120 is in contact with the upper die block 130 is placed almost horizontally and the rear surface 120c of the intermediate die block 120 and the rear surface 130c of the upper die block 130 are placed almost vertically, so the contact surface between the intermediate die block 120 and the upper die block 130 and the rear surface 120c of the intermediate die block 120 form almost a right angle. Accordingly, the sidewall of the step portion 142 extending from the reference plane 140a is almost a right angle to the reference plane 140a. When the shape of the intermediate die block 120 and the upper die block 130 is different from that of this embodiment and thus the angle between the contact surface of the intermediate die block 120 and the upper die block 130 and the rear surface 120c of the intermediate die block 120 is outside of a right angle, the angle between the sidewall of the step portion 142 and the reference plane 140a may be changed accordingly.

The multi-slot die coater may be usually made of a SUS material. In general, since liquid leakage easily occurs in the coupling surface of the SUS assembly, leakage may be suppressed by placing a rubber ring or any other flexible material between the components to form a seal. However, this sealing method is not suitable for controlling the uniform assembly type (for example, an assembly deviation of less than 10 μm), so it is difficult to apply to the multi-slot die coater.

By this reason, the multi-slot die coater needs to assemble the die blocks processed with very high precision (straightness, flatness±5 μm) by bolt fastening. It is necessary to prevent liquid leakage, and the bolt fastening is high pressure of about 200~350N. However, the high pressure bolt fastening may cause a non-uniform microscale distribution of stress, resulting in deformation of the block die, and the die block is deformed or twisted by the pressure of the coating solution supplied when coating. The fixing block 140 including the first cross section portion and the second cross section portion vertically extending from the first cross section portion, and having, for example, a '¬' or 'L' shape in cross section is a structure that can withstand the high pressure bolt fastening.

The fixing block 140 may be a single monolithic component, that is, the fixing block 140 is not divided into a plurality of components. That is, the fixing block 140 is an integrally formed and seamless component. It is possible to improve accuracy when assembling, and due to structural stiffness, provide high stability against external impacts when handling and using. In case that the fixing block 140 is not a monolithic component, and is formed by assembling at least two separate components, a fabrication tolerance of each component occurs, so after assembling the components, the total sum of tolerances increases, and it is difficult to align the components when assembling.

In this embodiment, the fixing block 140 couples the upper die block 130 and the intermediate die block 120. Additionally, as the step portion 142 is in close contact with the rear surface 130c of the upper die block 130, the step is formed between the rear surfaces 130c, 120c of the two die blocks 130, 120 coupled to the fixing block 140. Here, as the size of the step corresponds to the height h of the step portion 142, the step between the rear surfaces 130c, 120c of the two die blocks 130, 120 may be adjusted by adjusting the height h of the step portion 142. The step formed between the rear surfaces 130c, 120c of the two die blocks 130, 120 determines the position of the upper die lip 131 and the intermediate die lip 121 at the front end of each die block 130, 120, and it affects the coating gap.

Meanwhile, the multi-slot die coater 100 may further include a flat plate-shaped fixing portion 140' fastened to the rear surface 120c of the intermediate die block 120 and the rear surface 110c of the lower die block 110 using the bolt 141. As shown in FIG. 6, a plurality of fixing blocks 140 may be provided along the widthwise direction of the multi-slot die coater 100. The bolt 141 is fastened to the fixing block 140, and through this, the intermediate die block 120 and the upper die block 130 are assembled. The flat plate-shaped fixing portion 140' may be provided between two fixing blocks 140. The bolt 141 is fastened to the flat plate-shaped fixing portion 140', and through this, the intermediate die block 120 and the lower die block 110 are assembled. In another example, the fixing block 140 may be provided between two flat plate-shaped fixing portions 140'. The fixing block 140 can reliably achieve uniform widthwise gap control through the large surface contact of the means such as the block.

As the upper die block 130 and the intermediate die block 120 are combined into one by the construction of the fixing block 140 and the intermediate die block 120 and the lower die block 110 are combined into one by the construction of the flat plate-shaped fixing portion 140', there is an effect that the upper die block 130 slides toward the substrate 300 with respect to the intermediate die block 120 especially at the interface between the upper die block 130 and the intermediate die block 120, i.e., the first surface 120a where the intermediate die block 120 is in contact with the upper die block 130 and the surface 130b where the upper die block 130 faces the first surface 120a. Accordingly, the relative position of the upper exit port 102a and the lower exit port 101a is adjusted, and the coating gap is determined accordingly. As opposed to the conventional art, the coating gap can be easily determined through the coupling of the die blocks 130, 120 with the fixing block 140. Accordingly, it is possible to greatly reduce the inconvenience of dissembling the die blocks 130, 120, 110 and adjusting the position to adjust the coating gap each time.

This embodiment shows that the length of the upper die block 130 (the horizontal distance from the rear surface 130c to the upper die lip 131) is shorter than the length of the intermediate die block 120 and the lower die block 110 by way of illustration. In this state, when the step is formed in the upper die block 130 relative to the intermediate die block 120 as shown in FIG. 3, the lower die lip 111, the intermediate die lip 121 and the upper die lip 131 may be disposed on the same straight line. In this case, it is possible to achieve various film coating by moving back and forth the entire multi-slot die coater 100 with respect to the substrate 300.

According to this embodiment described above, the step is formed between the rear surfaces 130c, 120c of the die blocks 130, 120 through the fixing block 140 having the step portion 142. That is, the fixing block 140 already has the step portion 142 of the preset height h, and the upper die block 130 is coupled to the step portion 142 and the intermediate die block 120 is coupled to the other portion than the step portion 142, and thus the step corresponding to the height h of the step portion 142 is naturally formed between the rear surfaces 130c, 120c of the die blocks 130, 120 by the coupling. Thus, it is possible to always maintain the distance between the upper die lip 131, the intermediate die lip 121 and the substrate 300 at the front end of the die blocks 130, 120, i.e., the coating gap at a desired level, and since the fixing block 140 is fixed between the die blocks 130, 120, once it is set, the coating gap does not change and is maintained during the process.

Accordingly, there is no need to dissemble and re-assemble the die blocks 130, 120, 110 which are structurally vulnerable due to their small thickness when adjusting the coating gap, and it is possible to always maintain the uniform coating gap by simple manipulation of coupling the die blocks 130, 120 to the fixing block 140.

According to the present disclosure, it is possible to uniformly control the coating amount and the resultant coating quality by maintaining the uniform (±2%) coating gap considering that the die block is deformed by the pressure of the active material slurry issuing. Accordingly, it is possible to obtain coated products, especially, electrodes for secondary batteries, with uniform quality by using the multi-slot die coater having the uniform coating gap.

As described above, according to the present disclosure, it is possible to maintain the coating gap as adjusted, even when the pump pressure of the active material slurry increase. Accordingly, it is possible to ensure coating workability and reproducibility.

Using the multi-slot die coater, it is possible to uniformly form a coating layer, especially, the active material layer, to a desired thickness, and preferably, it is possible to simultaneously coat two types of electrode active material slurries, thereby achieving the outstanding performance and productivity.

In particular, when a plurality of fixing blocks 140 having the step portion 142 is provided in the widthwise direction of the multi-slot die coater 100, it is possible to achieve precise control without deviation of the coating gap in the widthwise direction.

An appropriate range of the coating gap is set according to the type of the active material slurry. The present disclosure includes multiple types of fixing blocks having the step portion of the suitable height h and performs the process by replacing the fixing block necessary for each production process, and thus it is possible to use the multi-slot die coater for general purpose without including each multi-slot die coater dedicated to each active material slurry to use various types of active material slurries. Additionally, when there is dispersion in the active material slurry, it is possible to quickly respond to the dispersion by immediately replacing only the fixing block.

As described above, using the multi-slot die coater of the present disclosure, it is possible to achieve uniform coating under the high speed or wide coating condition when manufacturing electrodes of secondary batteries by coating the active material slurry on the current collector while moving the current collector.

Meanwhile, although this embodiment describes applying the coating solution in two layers or performing pattern coating by supplying the coating solution in an alternating manner, it is obvious that the present disclosure may include three or more slots to simultaneously coat in three or more layers. It is obvious that four or more die blocks are needed for three or more slots.

Subsequently, other embodiments of the present disclosure will be described with reference to FIGS. 7 to 16. The same reference numerals as the above-described embodiment denote the same elements, and overlapping descriptions of the same elements are omitted, and difference(s) from the above-described embodiment is mainly described.

Figure 7:
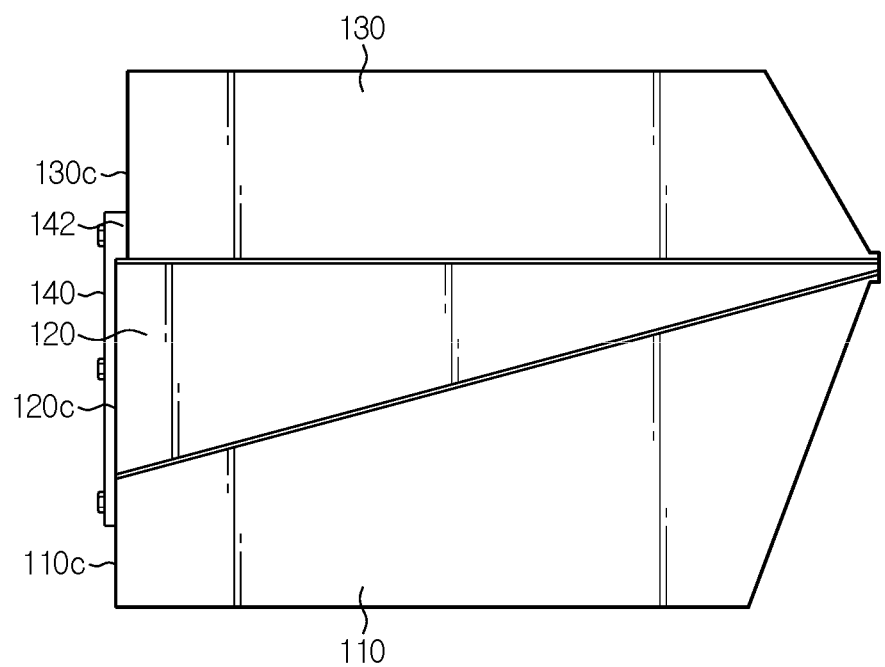
FIGS. 7 to 16 are schematic cross-sectional views of multi-slot die coaters according to other embodiments of the present disclosure.

The multi-slot die coater shown in FIG. 7 shows that the fixing block 140 shown and described in FIG. 3 is extended to the rear surface 110c of the lower die block 110 and thus the fixing block 140 is also coupled to the rear surface 110c of the lower die block 110. As described above, the fixing block 140 is not limited to a particular shape and may have any shape for forming the step between the rear surfaces 130c, 120c of the two die blocks 130, 120 coupled thereto. Additionally, in this case, the upper die block 130 and the intermediate die block 120 are coupled through the fixing block 140 and the step is formed between their rear surfaces 130c, 120c, and besides, the lower die block 110 is also coupled thereto, and thus the multi-slot die coater may not include the flat plate-shaped fixing portion (see 140' of FIG. 6) fastened to the rear surface 120c of the intermediate die block 120 and the rear surface 110c of the lower die block 110) using the bolt 141, and may further include the flat plate-shaped fixing portion in the fixing block 140, if necessary.

Figure 8:
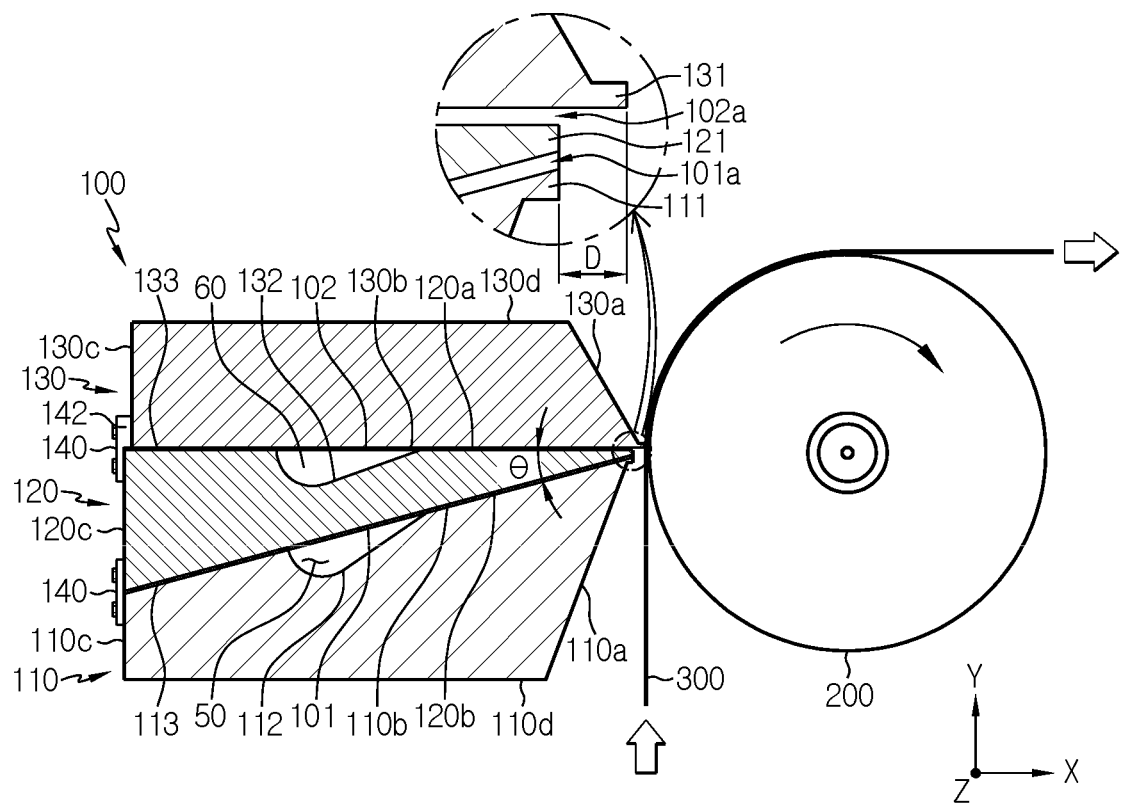

As opposed to the multi-slot die coater 100 of FIG. 3, the multi-slot die coater shown in FIG. 8 has the step D between the lower exit port 101a and the upper exit port 102a. When the length of the upper die block 130 (the horizontal distance from the rear surface 130c to the upper die lip 131) is equal to the length of the intermediate die block 120 and the lower die block 110, the upper die lip 131 may move further forward to the substrate 300 than the intermediate die lip 121 and the lower die lip 111 by the height h of the step portion 142 of the fixing block 140. Thus, the step D between the lower exit port 101a and the upper exit port 102a may be equal to the height h of the step portion 142 of the fixing block 140. When there is the step D between the lower exit port 101a and the upper exit port 102a, the lower exit port 101a and the upper exit port 102a are spaced apart from each other along the horizontal direction, thereby eliminating the risk that the second coating solution 60 issuing from the upper exit port 102a enters the lower exit port 101a or the first coating solution 50 issuing from the lower exit port 101a enters the upper exit port 102a.

That is, the coating solution issuing through the lower exit port 101a or the upper exit port 102a is blocked by the surface that forms the step formed between the lower exit port 101a and the upper exit port 102a and thus does not enter the other exit port, thereby achieving a more smooth multi-layer active material coating process.

Figure 9:
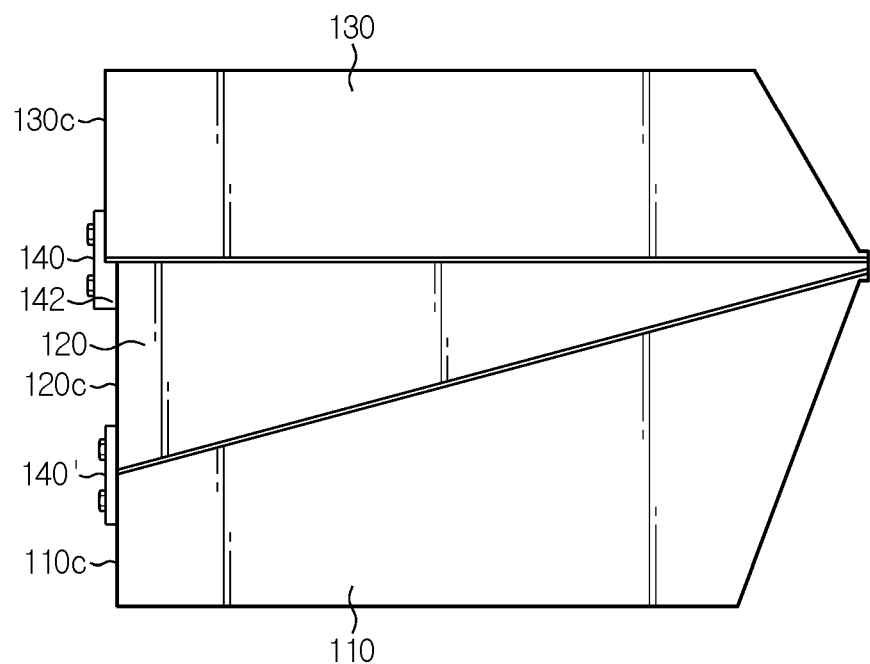

The step formed between the rear surface 130c of the upper die block 130 and the rear surface 120c of the intermediate die block 120 in FIG. 9 is the same as the multi-slot die coater 100 of FIG. 3, but as opposed to FIG. 3, the step portion 142 of the fixing block 140 is in close contact with the rear surface 120c of the intermediate die block 120, not the rear surface 130c of the upper die block 130. As described above, when the step is formed between the rear surfaces 130c, 120c of the two die blocks 130, 120, the step portion 142 of the fixing block 140 comes into close contact with the rear surface of any one of the two die blocks 130, 120, and the die block having the rear surface in close contact with the step portion 142 moves forward to the substrate (see 300 of FIG. 3).

Figure 10:
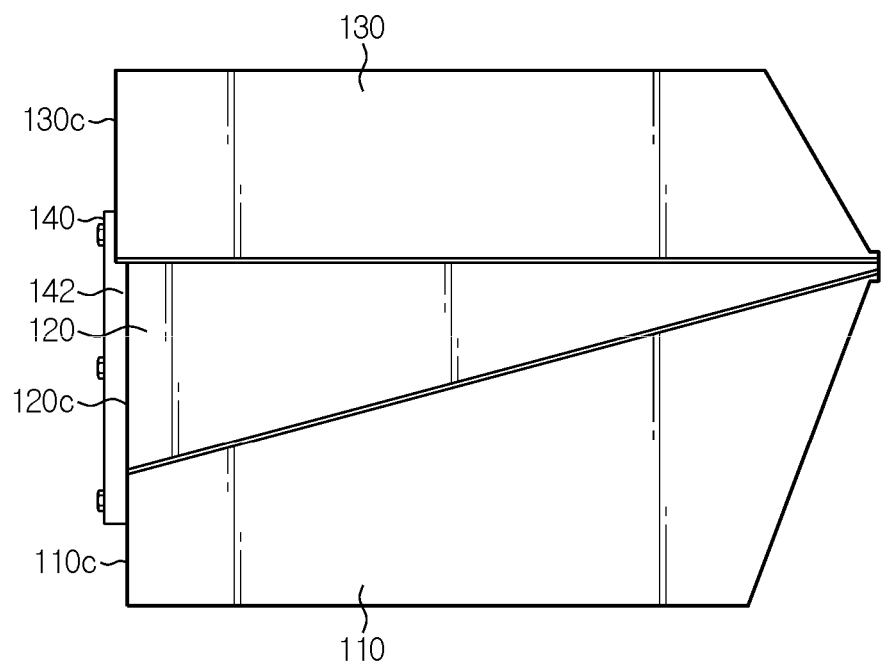

FIG. 10 is similar to FIG. 9, and shows that the fixing block 140 is simply extended to the rear surface 110c of the lower die block 110 and thus may be also coupled to the rear surface 110c of the lower die block 110. In this case, the step portion 142 is extended to the rear surface 110c of the lower die block 110.

Figure 11:
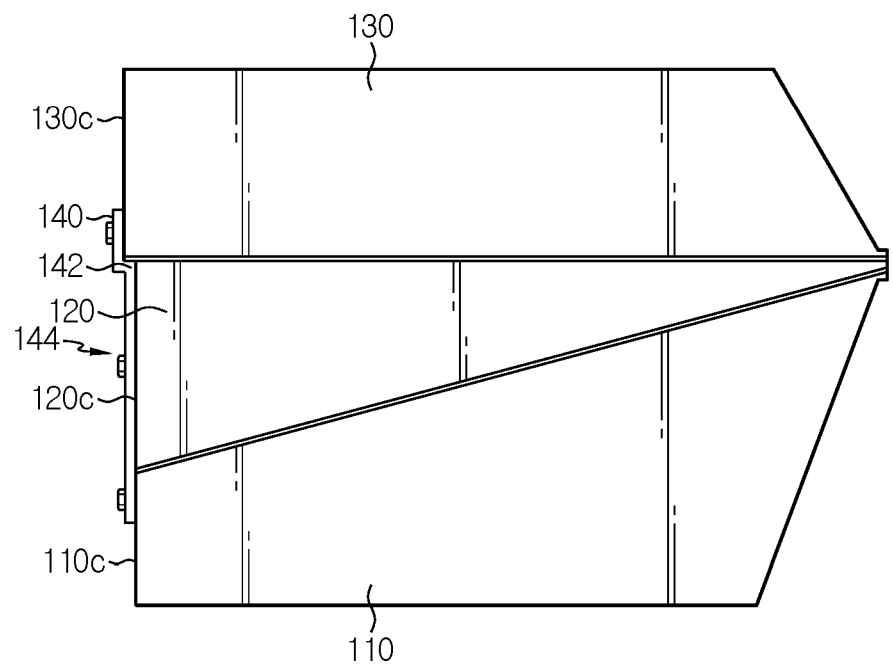

In the previous embodiments, the rear surface opposite the surface to which the rear surfaces 130c, 120c of the die blocks 130, 120 are coupled in the fixing block 140 is flat. However, as shown in FIG. 11, the step portion 144 recessed toward the front end may be further formed on the rear surface opposite the surface to which the rear surfaces 130c, 120c of the die blocks 130, 120 are coupled in the fixing block 140. As described above, the fixing block 140 is not limited to a particular shape when it has the step portion 142 and a structure for coupling each die block 130, 120, 110 to support them.

The embodiments described above describe an example in which the step is formed between the rear surfaces 130c, 120c of the upper die block 130 and the intermediate die block 120. The step may be formed between any two of the die blocks 130, 120, 110.

Figure 12:
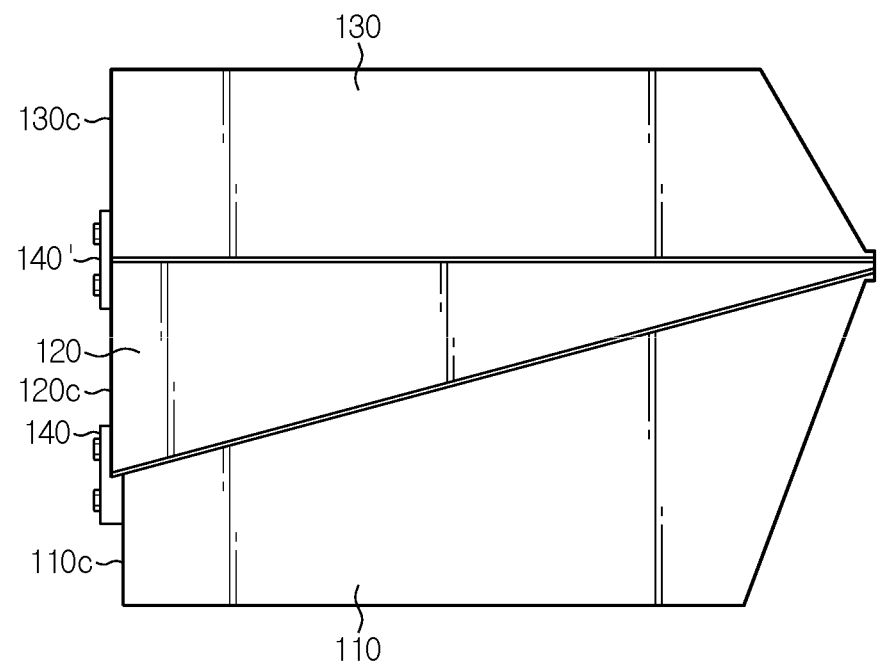
Figure 13:
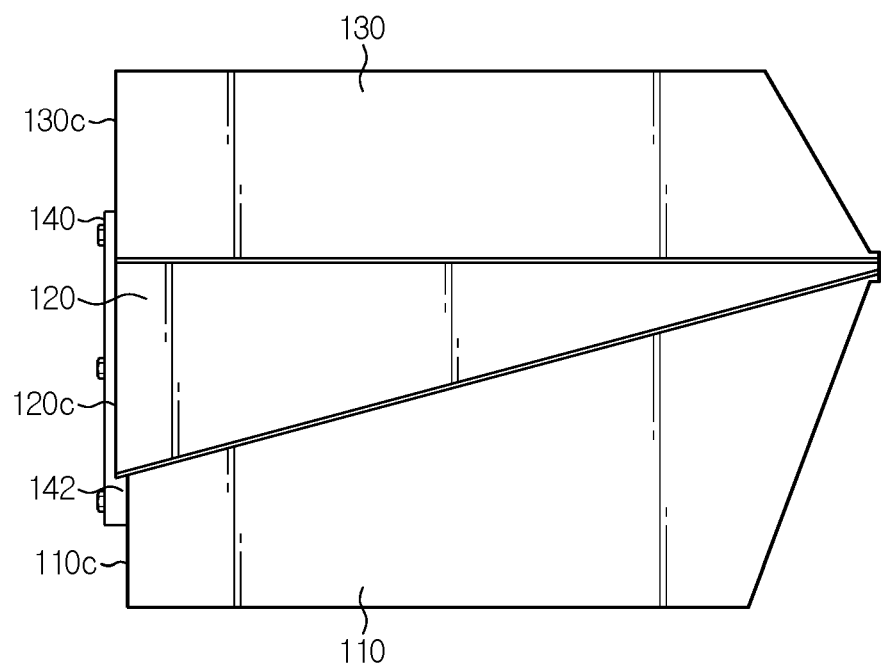

As such an example, FIGS. 12 and 13 show examples of the fixing block 140 whereby the step may be formed between the intermediate die block 120 and the lower die block 110. In this example, when the length of the upper die block 130, the intermediate die block 120 and the lower die block 110 is equal, as opposed to FIG. 8, the lower exit port 101a moves further forward to the substrate (see 300 of FIG. 3) than the upper exit port 102a to form the step between the lower exit port 101a and the upper exit port 102a. In this instance, the lower die lip 111 on the downstream side in the movement direction of the substrate 300 is closer to the substrate 300 than the upper die lip 131 on the upstream side. Due to this feature, it is possible to uniformly adjust the thickness by applying pressure to the first coating solution 50 issuing from the lower exit port 101a by the lower die lip 111 and expanding the first coating solution 50 in the widthwise direction.

Additionally, in FIGS. 12 and 13, the contact surface of the intermediate die block 120 and the lower die block 130 is inclined with respect to the horizontal plane. Accordingly, in the fixing block 140, an angle between the sidewall of the step portion (see 142 of FIG. 5) and the reference plan (see 140a of FIG. 5) is not a right angle, and is an angle of the contact surface of the intermediate die block 120 and the lower die block 130.

Figure 14:
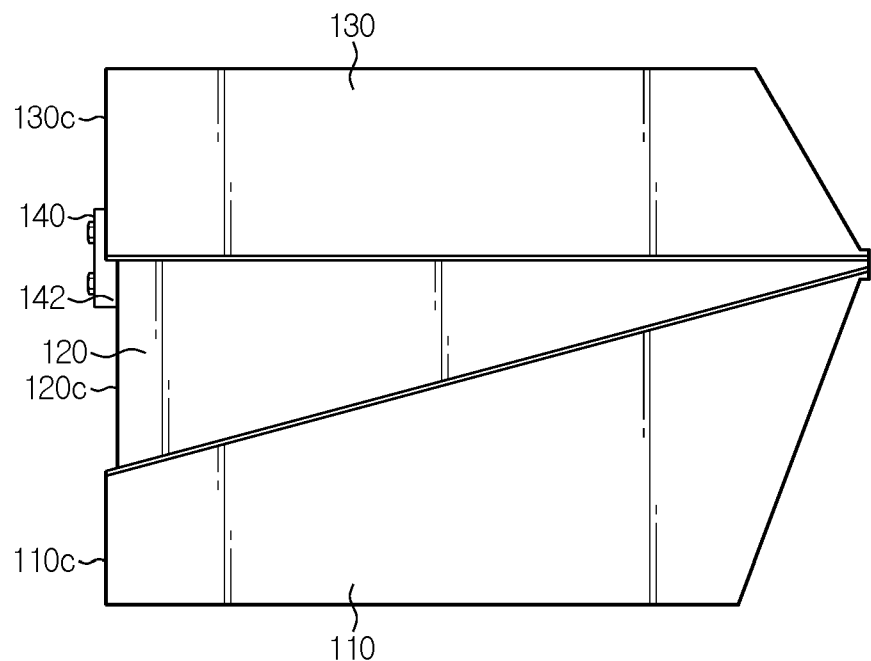
Figure 15:
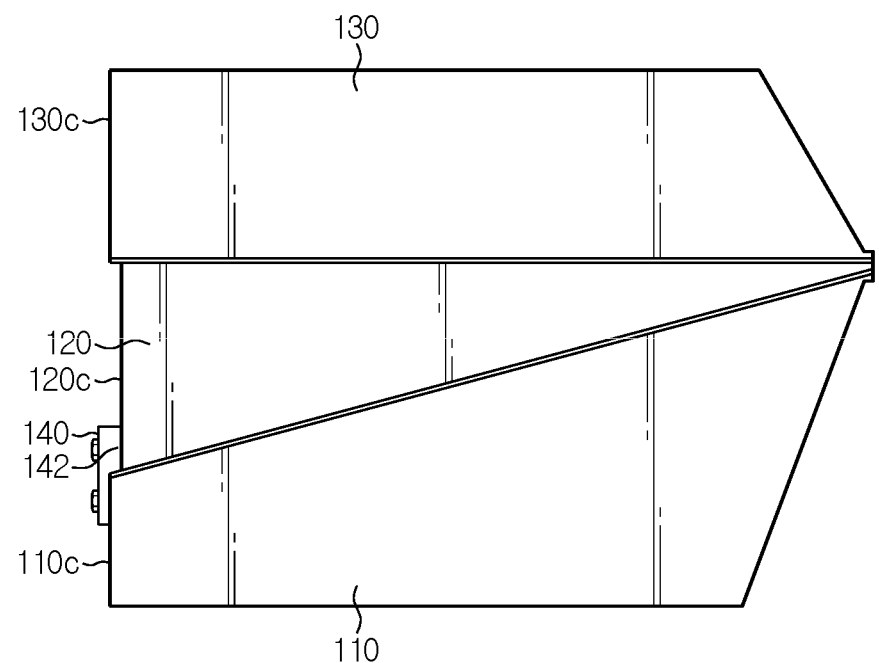
Figure 16:
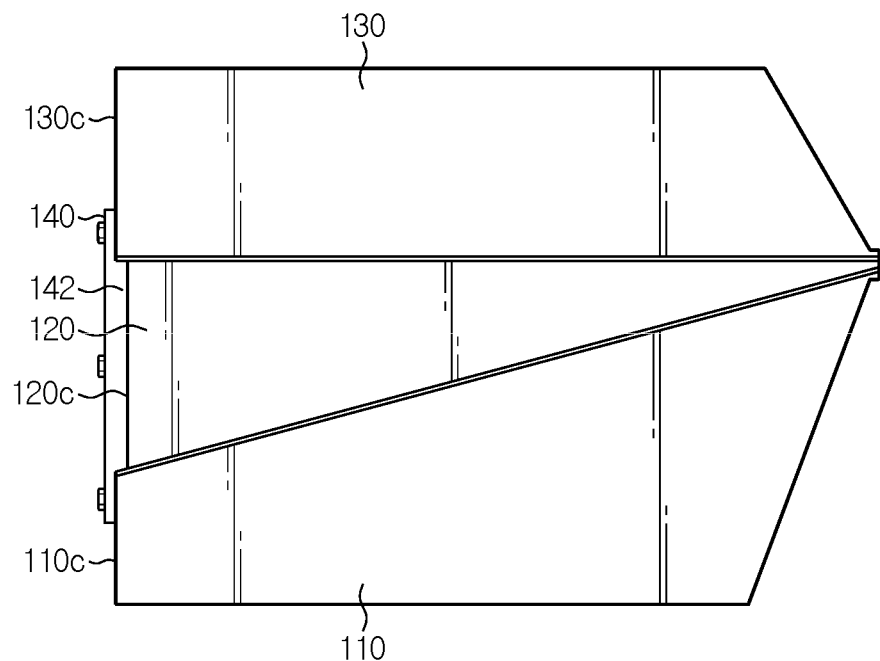

FIGS. 14 to 16 show examples of the fixing block 140 having the step so that the rear surface 120c of the intermediate die block 120 moves further forward to the substrate (see 300 of FIG. 3) than the rear surfaces 130c, 110c of the other die blocks 130, 110.

Figure 17:
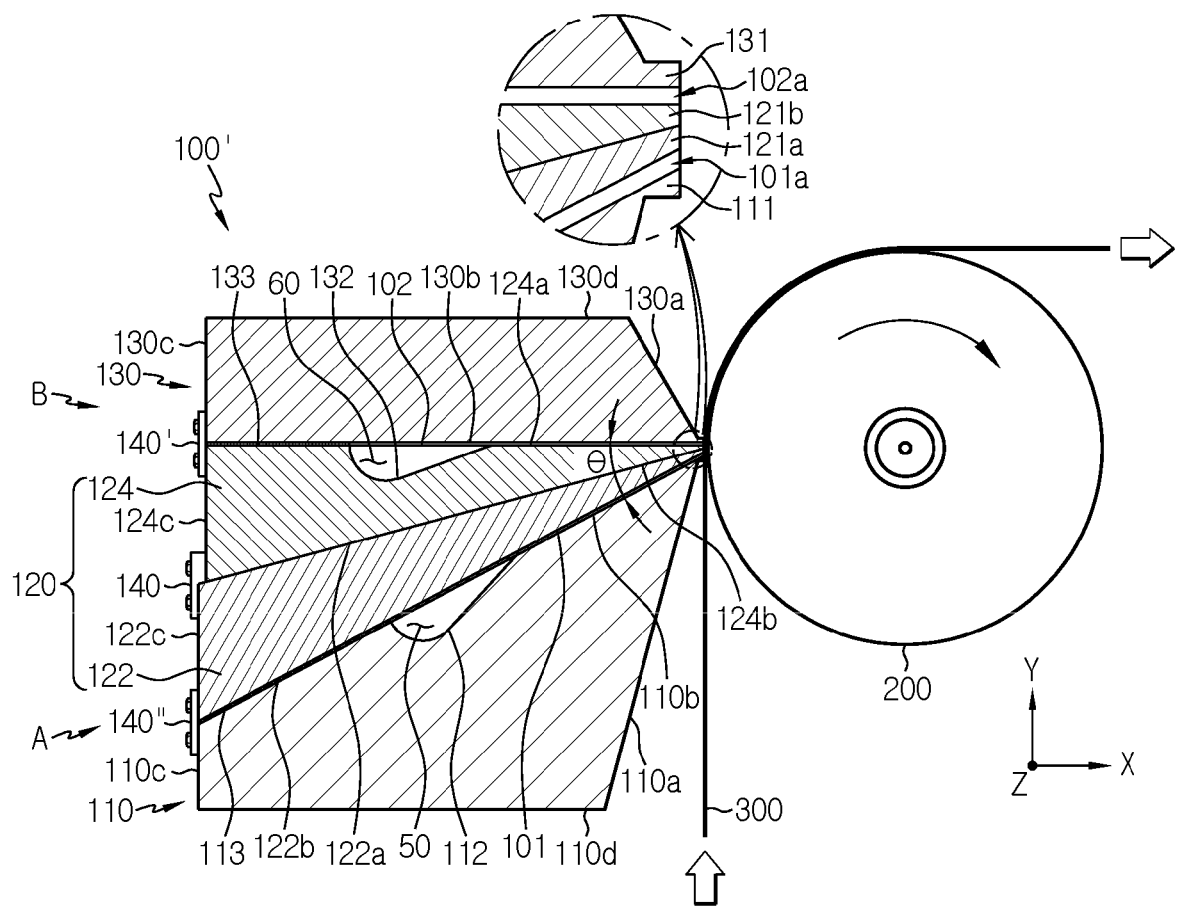
FIG. 17 is a schematic cross-sectional view of a multi-slot die coater according to another embodiment of the present disclosure.
Figure 18:
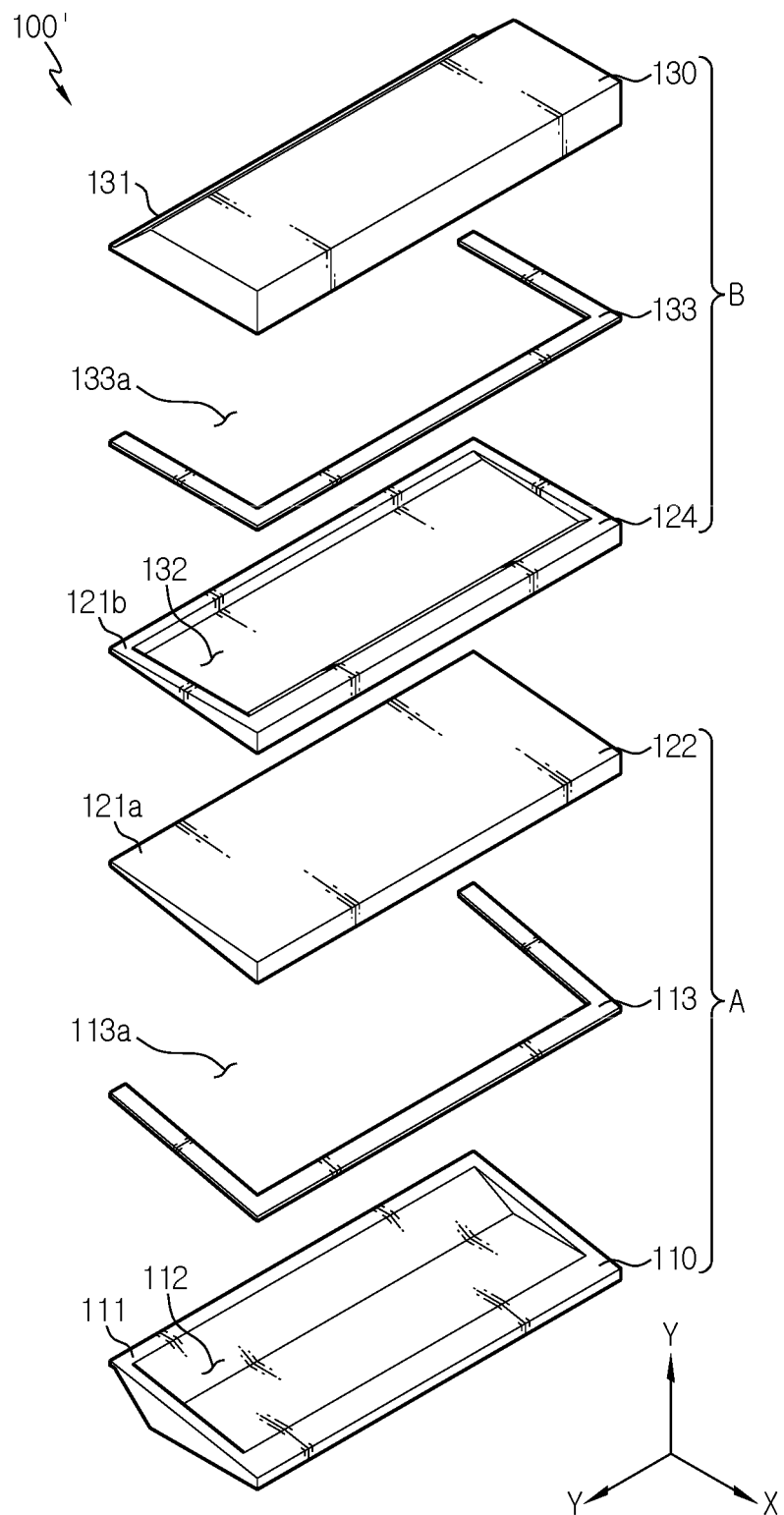
FIG. 18 is a schematic exploded perspective view of a multi-slot die coater according to another embodiment of the present disclosure.
Figure 19:
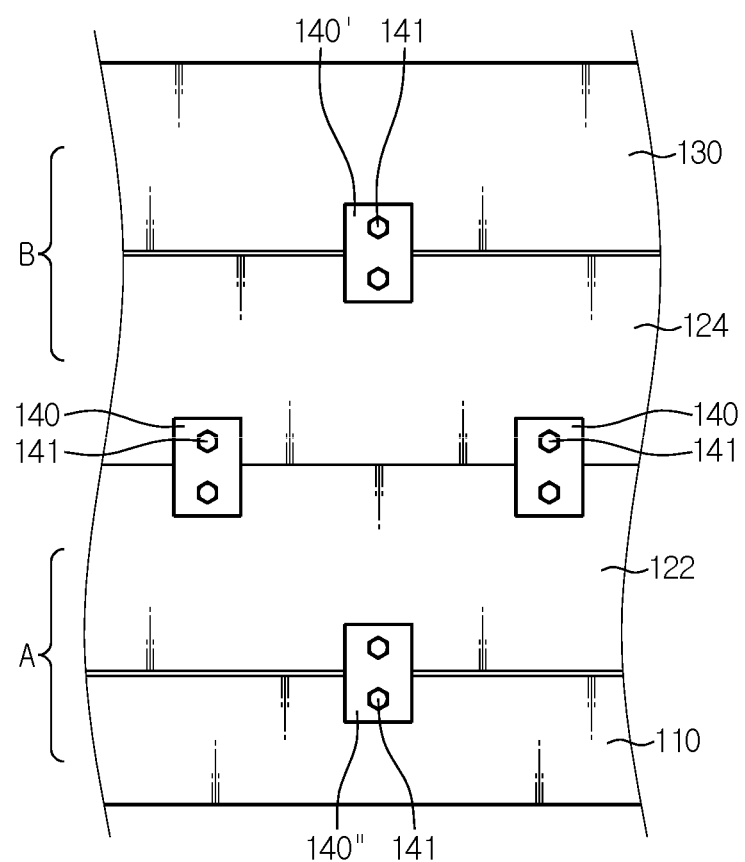
FIG. 19 is a rear view of a multi-slot die coater according to another embodiment of the present disclosure.

FIG. 17 is a schematic cross-sectional view of a multi-slot die coater according to another embodiment of the present disclosure, FIG. 18 is a schematic exploded perspective view of the multi-slot die coater according to another embodiment of the present disclosure, and FIG. 19 is a rear view of the multi-slot die coater according to another embodiment of the present disclosure.

The multi-slot die coater 100' according to another embodiment of the present disclosure is an apparatus including a lower slot 101 and an upper slot 102 to coat the same type of coating solution or two different types of coating solutions to the substrate 300 through the lower slot 101 and the upper slot 102 simultaneously or alternately. Referring to FIGS. 17 and 18, the multi-slot die coater 100' includes a lower die A and an upper die B positioned on the lower die A. The lower die A includes a lower die block 110, and a first intermediate die block 122 positioned on the lower die block 110. The first intermediate die block 122 has the lower slot 101 between the first intermediate die block 122 and the lower die block 110. The upper die B includes a second intermediate die block 124 installed on the first intermediate die block 122, and an upper die block 130 positioned on the second intermediate die block 124. The second intermediate die block 124 has the upper slot 102 between the second intermediate die block 124 and the upper die block 130.

In FIG. 17, the multi-slot die coater 100' is installed such that the direction (X direction) in which the active material slurry or the coating solution emerges is almost horizontal (almost: ±5°). The first intermediate die block 122 and the second intermediate die block 124 form an intermediate die block 120. The intermediate die block 120 is a block in the middle of the blocks of the multi-slot die coater 100', and is positioned between the lower die block 110 and the upper die block 130. The intermediate die block 120 of this embodiment is in the shape of approximately a right angle in cross section, but is not necessarily limited thereto, and for example, may be provided in the shape of an isosceles triangle in cross section. In the intermediate die block 120, the first intermediate die block 122 and the second intermediate die block 124 are in contact with each other in the vertical direction, and make relative movement by sliding along the contact surface.

A first surface 124a where the second intermediate die block 124 is in contact with the upper die block 130 is placed almost horizontally and a second surface 124b opposite the first surface 124a in the second intermediate die block 124 is in close contact with a first surface 122a of the first intermediate die block 122, and relative movement is made along the contact surface between them. A second surface 122b opposite the first surface 122a in the first intermediate die block 122 is in contact with the lower die block 110.

The first surface 124a where the second intermediate die block 124 is in contact with the upper die block 130 is placed almost horizontally and a surface 130d (i.e., a surface that forms the upper surface of the outer peripheral surface of the multi-slot die coater 100') opposite a surface 130b facing the first surface 124a in the upper die block 130 is also placed almost horizontally. Accordingly, the first surface 124a and the opposite surface 130d are almost parallel. Additionally, a surface 110d (i.e., a surface that forms the lower surface of the outer peripheral surface of the multi-slot die coater 100') opposite the surface 110b where the lower die block 110 is in contact with the first intermediate die block 122 is also placed almost horizontally, and this surface is the bottom surface 110d (X-Z plane).

The surface opposite to the direction in which the active material slurry emerges in the lower die block 110, the first and second intermediate die blocks 122, 124 and the upper die block 130, i.e., the rear surface 110c, 122c, 124c, 130c are placed almost vertically (Y direction).

In the outermost die block, i.e., the lower die block 110 and the upper die block 130, among the surfaces that form the outer peripheral surface of the multi-slot die coater 100', the bottom surface 110d of the lower die block 110 and the top surface 130d of the upper die block 130 may be almost perpendicular to the rear surfaces 110c, 130c. Additionally, the first surface 124a of the second intermediate die block 124 may be almost perpendicular to the rear surface 124c. In the die blocks 110, 124, 130, since corners at which sides meet are right-angled, a right angle portion in cross section exists, and a vertical or horizontal plane may be used as a reference plane, and thus it is easy to manufacture or handle and possible to ensure precision. Additionally, when combined together, the lower die block 110, the first and second intermediate die blocks 122, 124 and the upper die block 130 have an approximately rectangular parallelepiped shape as a whole, and are inclined toward the substrate 300 only at the front side where the coating solution emerges (see the surface 130a of the upper die block 130, the surface 110a of the lower die block 110). The shape after assembly is approximately similar to a slot die coater (for example, 30 of FIG. 1) including a single slot, so it is possible to share a slot die coater support or the like.

The lower die block 110, the first and second intermediate die blocks 122, 124 and the upper die block 130 are not necessarily limited thereto, and for example, may be configured as a vertical die such that the direction in which the active material slurry emerges is an upper direction and the rear surfaces 110c, 122c, 124c, 130c are bottom surfaces.

The lower die block 110 is the lowermost block among the blocks of the multi-slot die coater 100', and the surface 110b facing the first intermediate die block 122 is inclined at an angle of approximately 20 to 60° to the bottom surface 110d.

The lower slot 101 may be formed at a location in which the lower die block 110 and the first intermediate die block 122 are in contact with each other. For example, a first spacer 113 may be interposed between the lower die block 110 and the first intermediate die block 122 to provide a gap between them, and thus the lower slot 101 corresponding to a passage through which the first coating solution 50 may flow may be formed. In this case, the thickness of the first spacer 113 determines the vertical width (Y-axis direction, the slot gap) of the lower slot 101.

As shown in FIG. 18, the first spacer 113 has a first opening portion 113a which is cut at an area, and may be interposed in the remaining area except one side of the edge area of the facing surface of each of the lower die block 110 and the first intermediate die block 122. Accordingly, the lower exit port 101a through which the first coating solution 50 emerges is only formed between the front end of the lower die block 110 and the front end of the first intermediate die block 122. The front end of the lower die block 110 and the front end of the first intermediate die block 122 are defined as a lower die lip 111 and a first intermediate die lip 121a, respectively, and that is to say, the lower exit port 101a may be formed by the spacing between the lower die lip 111 and the first intermediate die lip 121a.

For reference, except the area in which the lower exit port 101a is formed, the first spacer 113 acts as a gasket to prevent the leakage of the first coating solution 50 through the gap between the lower die block 110 and the first intermediate die block 122, and thus is preferably made of a material having sealing ability.

The lower die block 110 includes a first manifold 112 having a predetermined depth on the surface 110b facing the first intermediate die block 122, and the first manifold 112 is in communication with the lower slot 101. The first manifold 112 is a space formed from the surface 110b where the lower die block 110 is in contact with the first intermediate die block 122 to the surface 110d opposite the surface 110b. The first manifold 112 is connected to a first coating solution supply chamber (not shown) installed outside with a supply pipe and is supplied with the first coating solution 50. When the first manifold 112 is fully filled with the first coating solution 50, the flow of the first coating solution 50 is guided along the lower slot 101 and comes out of the lower exit port 101a.

The upper die block 130 is positioned in contact with the first surface 124a which is the upper surface of the second intermediate die block 124 in parallel to the bottom surface. As described above, the upper slot 102 is formed at a location in which the second intermediate die block 124 and the upper die block 130 are in contact with each other.

In the same way as the lower slot 101 described above, a second spacer 133 may be interposed between the second intermediate die block 124 and the upper die block 130 to provide a gap between them. Accordingly, the upper slot 102 corresponding to a passage through which the second coating solution 60 may flow is formed. In this case, the vertical width (Y-axis direction, the slot gap) of the upper slot 102 is determined by the second spacer 133.

Additionally, the second spacer 133 has a similar structure to the first spacer 113 and includes a second opening portion 133a which is cut at an area, and is interposed in the remaining area except one side of the edge area of the facing surface of each of the second intermediate die block 124 and the upper die block 130. Likewise, the circumferential direction except the front side of the upper slot 102 is blocked and the upper exit port 102a is only formed between the front end of the second intermediate die block 124 and the front end of the upper die block 130. The front end of the second intermediate die block 124 is defined as a second intermediate die lip 121b and the front end of the upper die block 130 is defined as an upper die lip 131, and that is to say, the upper exit port 102a may be formed by the spacing between the second intermediate die lip 121b and the upper die lip 131.

Additionally, the second intermediate die block 124 includes a second manifold 132 having a predetermined depth on the first surface 124a facing the upper die block 130, and the second manifold 132 is in communication with the upper slot 102. The second intermediate die block 124 has a second surface 124b facing the first surface 120a. The second surface 124b is a surface where the second intermediate die block 124 is in contact with the first intermediate die block 122. The second manifold 132 is a space formed from the first surface 124a to the second surface 124b. Although not shown in the drawings, the second manifold 132 is connected to a supply chamber for the second coating solution 60 installed outside with a supply pipe and is supplied with the second coating solution 60. When the second coating solution 60 is supplied from the external source along the supply pipe and the second manifold 132 is fully filled with the second coating solution 60, the flow of the second coating solution 60 is guided along the upper slot 102 in communication with the second manifold 132 and comes out of the upper exit port 102a.

Meanwhile, an angle θ between the first surface 124a where the second intermediate die block 124 is in contact with the upper die block 130 and the second surface 122b where the first intermediate die block 122 is in contact with the lower die block 110 is preferably in the range in which a turbulence is not formed immediately after the active material slurry issuing from the upper exit port 102a and the active material slurry issuing from the lower exit port 101a emerge out at the same time. When the angle θ is too small, the intermediate die block 120 is too thin and very vulnerable to deformation and twist.

In addition, the multi-slot die coater further includes a fixing block 140 fastened to the rear surface 110c, 122c, 124c, 130c of the die blocks 110, 122, 124, 130 on the opposite surface to the front end of the lower die A and the upper die B using the bolt 141 to couple the lower die A and the upper die B.

The fixing block 140 is the same as shown in FIG. 3, the fixing block 140 includes a step portion 142 which protrudes toward the front end with respect to the reference plane in close contact with the rear surface of any one of the lower die A and the upper die B, and the rear surface of the other die among the lower die A and the upper die B are in close contact with the step portion 142, and thus the step is formed between the rear surfaces of the lower die A and the upper die B coupled to the fixing block 140.

In this embodiment, the fixing block 140 couples the first intermediate die block 122 and the second intermediate die block 124. Additionally, as the step portion 142 is in close contact with the rear surface 124c of the second intermediate die block 124, the step is formed between the rear surfaces 122c, 124c of the two die blocks 122, 124 coupled to the fixing block 140. Here, as the size of the step corresponds to the height h of the step portion 142, the step between the rear surfaces 122c, 124c of the two die blocks 122, 124 may be adjusted by adjusting the height h of the step portion 142. The step formed between the rear surfaces 122c, 124c of the two die blocks 122, 124 determines the position of the first intermediate die lip 121a and the second intermediate die lip 121b at the front end of each die block 122, 124, and it affects the coating gap.

Meanwhile, the multi-slot die coater may further include a flat plate-shaped fixing portion 140' fastened to the rear surface 130c of the upper die block 130 and the rear surface 124c of the second intermediate die block 124 using the bolt 141 and a flat plate-shaped fixing portion 140" fastened to the rear surface 122c of the first intermediate die block 122 and the rear surface 110c of the lower die block 110 using the bolt 141. A plurality of fixing blocks 140 may be provided along the widthwise direction of the multi-slot die coater 100' as shown in FIG. 19. The bolt 141 is fastened to the fixing block 140, and through this, the lower die A and the intermediate die B are assembled. The flat plate-shaped fixing portion 140' may be provided between the two fixing blocks 140. The bolt 141 is fastened to the flat plate-shaped fixing portion 140', and through this, the upper die block 130 and the second intermediate die block 124 are assembled. In another example, the fixing block 140 may be provided between two flat plate-shaped fixing portions 140'. The bolt 141 is fastened to the flat plate-shaped fixing portion 140", and through this, the first intermediate die block 122 and the lower die block 110 are assembled. In still another example, the fixing block 140 may be provided between two flat plate-shaped fixing portions 140". The fixing block 140 can reliably achieve uniform widthwise gap control through the large surface contact of the means such as the block.

The upper die block 130 and the second intermediate die block 124 are fixed and coupled to each other by the construction of the flat plate-shaped fixing portion 140', and the first intermediate die block 122 and the lower die block 110 are fixed and coupled to each other by the construction of the flat plate-shaped fixing portion 140". Accordingly, the upper die block 130 and the second intermediate die block 124 may move together, and the first intermediate die block 122 and the lower die block 110 may move together. That is, a first flat surface (in this embodiment, the first surface 122a of the first intermediate die block 122) formed on the lower die A and a second flat surface (in this embodiment, the second surface 124b of the second intermediate die block 124) formed below the upper die B contact each other to form a sliding surface, and the upper die B and the lower die A are installed such that any one die slides along the sliding surface to make relative movement in the horizontal direction.

When it is necessary to change the relative position between the lower exit port 101a and the upper exit port 102a, the multi-slot die coater 100' according to an embodiment of the present disclosure can simply adjust by the sliding movement of the lower die A and/or the upper die B, and does not need to dissemble and re-assemble each die block 110, 120, 130, thereby significantly improving workability. The relative position of the upper exit port 102a and the lower exit port 101a is adjusted, and as the fixing block 140 is coupled between the lower die A and the upper die B, the coating gap is determined. Thus, it is possible to greatly reduce the inconvenience of dissembling the die blocks 130, 122, 124, 110 and adjusting the position to adjust the coating gap each time.

This embodiment shows that the length of the upper die B (for example, the horizontal distance from the rear surface 130c of the upper die block 130 to the upper die lip 131) is shorter than the length of the lower die A (for example, the horizontal distance from the rear surface 110c of the lower die block 110 to the lower die lip 111) by way of illustration. In this state, when the step is formed in the rear surface of the upper die B relative to the rear surface of the lower die A as shown in FIG. 17, the lower die lip 111, the first and second intermediate die lips 121a, 121b and the upper die lip 131 may be disposed on the same straight line. In this case, various film coating may be performed by moving back and forth the entire multi-slot die coater 100' with respect to the substrate 300.

According to this embodiment described above, the step is formed between the rear surfaces of the upper die B and the lower die A through the fixing block 140 having the step portion 142. That is, the fixing block 140 already has the step portion 142 of the preset height h, and the second intermediate die block 124 is coupled to the step portion 142 and the first intermediate die block 122 is coupled to the other portion than the step portion 142, and thus the step corresponding to the height h of the step portion 142 is naturally formed between the rear surfaces 124c, 123c of the die blocks 124, 122 by the coupling. Thus, it is possible to always maintain the distance between the first and second intermediate die lips 121a, 121b at the front end of the die blocks 124, 122 and the substrate 300, i.e., the coating gap at a desired level, and since the fixing block 140 is fixed between the die blocks 124, 122, thus once it is set, the coating gap does not change and is maintained during the process.

Accordingly, there is no need to dissemble and re-assemble the die blocks 130, 124, 122, 110 which are structurally vulnerable due to their small thickness when adjusting the coating gap, and it is possible to always maintain the uniform coating gap by simple manipulation of coupling the die blocks 124, 122 to the fixing block 140.

Subsequently, other embodiments of the present disclosure will be described with reference to FIGS. 20 to 26. The same reference numerals as the previous embodiment denote the same elements, overlapping descriptions of the same elements are omitted, and difference(s) from the previous embodiments is mainly described.

Figure 20:
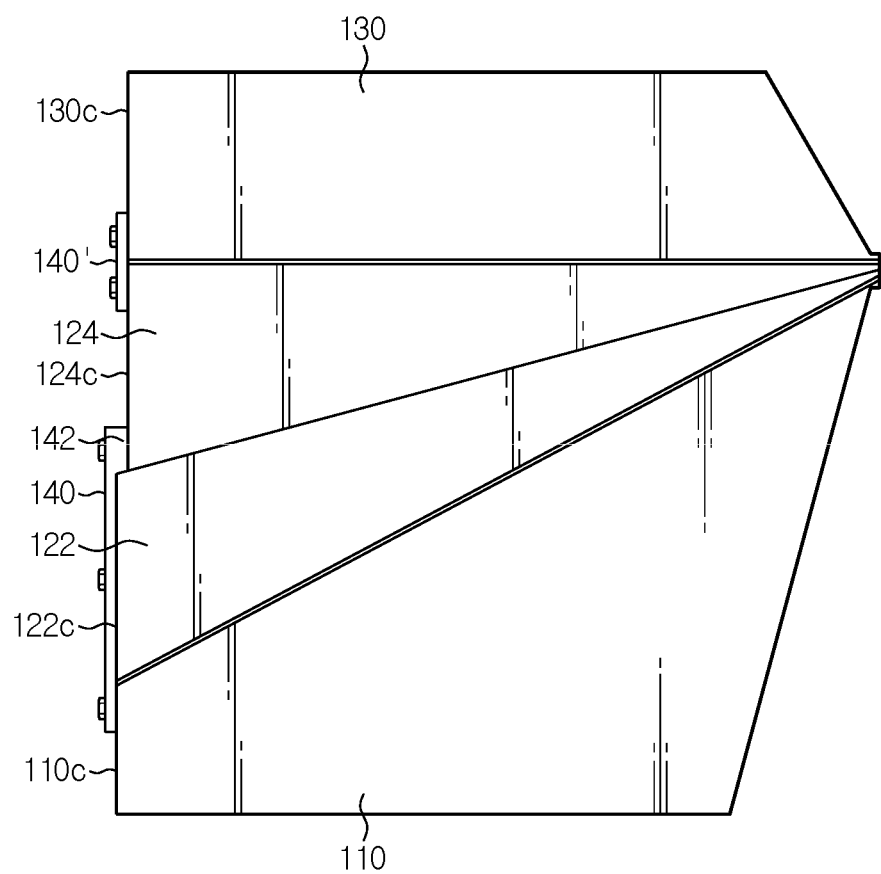
FIGS. 20 to 26 are schematic cross-sectional views of multi-slot die coaters according to other embodiments of the present disclosure.

The multi-slot die coater shown in FIG. 20 shows that the fixing block 140 shown and described in FIG. 17 is extended to the rear surface 110c of the lower die block 110 and thus the fixing block 140 is also coupled to the rear surface 110c of the lower die block 110. As described above, the fixing block 140 is not limited to a particular shape and may have any shape for forming the step between the rear surfaces 124c, 122c of the die blocks 124, 122 coupled thereto. Additionally, in this case, when the second intermediate die block 124 and the first intermediate die block 122 are coupled through the fixing block 140, the step may be formed between the rear surfaces 124c, 122c, and the lower die block 110 may be also coupled, and thus the multi-slot die coater may not include the flat plate-shaped fixing portion (see 140" of FIG. 19) fastened to the rear surface 122c of the first intermediate die block 122 and the rear surface 110c of the lower die block 110 using the bolt 141, and may further include the flat plate-shaped fixing portion in the fixing block 140, if necessary.

Figure 21:
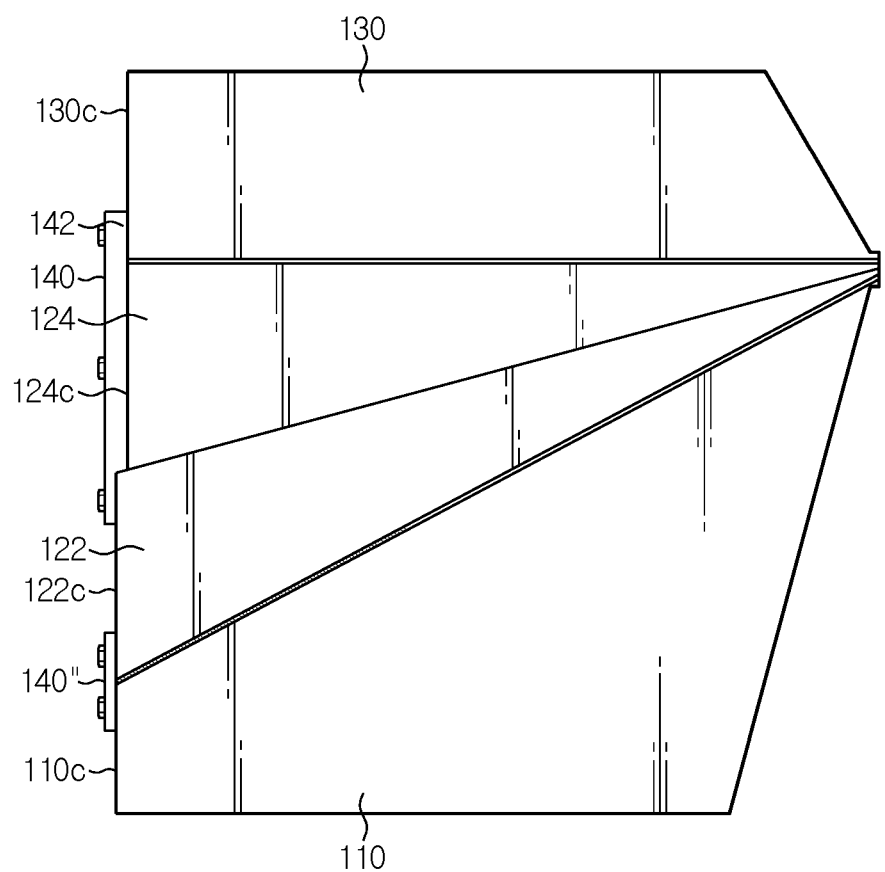

The multi-slot die coater shown in FIG. 21 shows that the fixing block 140 shown and described in FIG. 17 is extended to the rear surface 130c of the upper die block 130 and thus the fixing block 140 is also coupled to the rear surface 130c of the upper die block 130. As described above, the fixing block 140 is not limited to a particular shape and may have any shape for forming the step between the rear surfaces 124c, 122c of the two die blocks 124, 122 coupled thereto. Additionally, in this case, when the second intermediate die block 124 and the first intermediate die block 122 are coupled through the fixing block 140, the step is formed between their rear surfaces 124c, 122c, and the upper die block 130 is also coupled, and thus the multi-slot die coater may not include the flat plate-shaped fixing portion (see 140' of FIG. 19) fastened to the rear surface 130c of the upper die block 130 and the rear surface 124c of the second intermediate die block 124 using the bolt 141, and may further include the flat plate-shaped fixing portion in the fixing block 140, if necessary.

Figure 22:
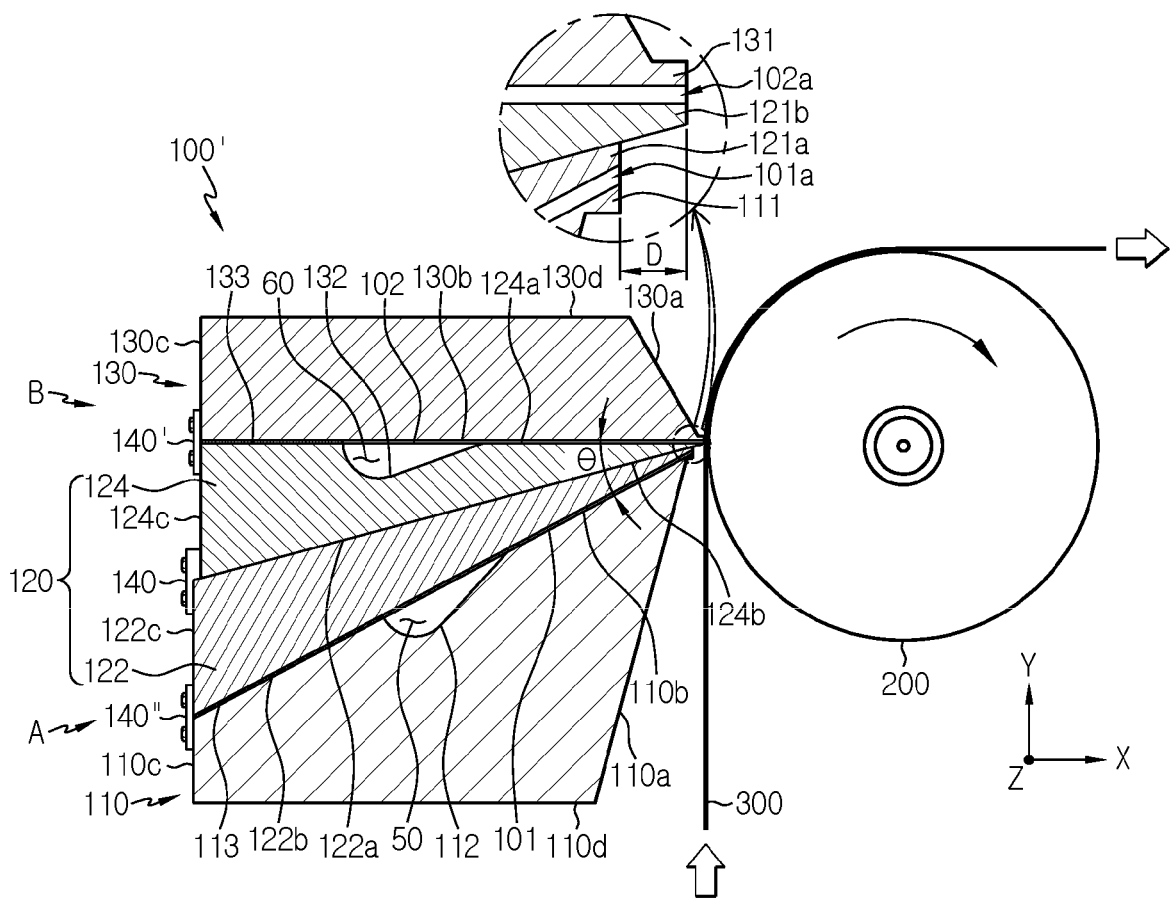

As opposed to the multi-slot die coater 100' of FIG. 17, the multi-slot die coater shown in FIG. 22 has the step D between the lower exit port 101a and the upper exit port 102a. When the length of the upper die B is equal to the length of the lower die A, the upper die lip 131 and the second intermediate die lip 121b may move further forward to the substrate 300 than the first intermediate die lip 121a and the lower die lip 111 by the height h of the step portion 142 of the fixing block 140. Thus, the step D between the lower exit port 101a and the upper exit port 102a may be equal to the height h of the step portion 142 of the fixing block 140. When the step D is formed between the lower exit port 101a and the upper exit port 102a, the lower exit port 101a and the upper exit port 102a are spaced apart from each other along the horizontal direction, and thus there is no risk that the second coating solution 60 issuing from the upper exit port 102a may enter the lower exit port 101a, or the first coating solution 50 issuing from the lower exit port 101a may enter the upper exit port 102a.

That is, there is no risk that the coating solution issuing through the lower exit port 101a or the upper exit port 102a may be blocked by the surface that forms the step between the lower exit port 101a and the upper exit port 102a and enters the other exit port, thereby performing a more smooth multi-layer active material coating process.

As described above, the multi-slot die coater 100' has the two exit ports 101a, 102a and may be used to form the two active material layers on the current collector, and for smooth coating of the active material slurry, the two exit ports 101a, 102a may be disposed at the front and rear positions, spaced apart from each other along the horizontal direction. The relative movement of the lower die A and the upper die B may be made using a separate device for adjusting the shape of the multi-slot die coater 100' or through an operator's manual task.

For example, the step may be formed between the lower exit port 101a and the upper exit port 102a by moving the upper die B to the predetermined distance D in the forward direction that is the same as the direction in which the active material slurry emerges along the sliding surface while not moving the lower die A. Additionally, the step is maintained by fastening the fixing block 140. The width D of the step may be determined in the range of approximately a few micrometers to a few millimeters, and may be determined based on the thickness of the active material layer formed on the current collector. For example, as the thickness of the active material layer that will be formed on the current collector increases, the width D of the step may increase.

Figure 23:
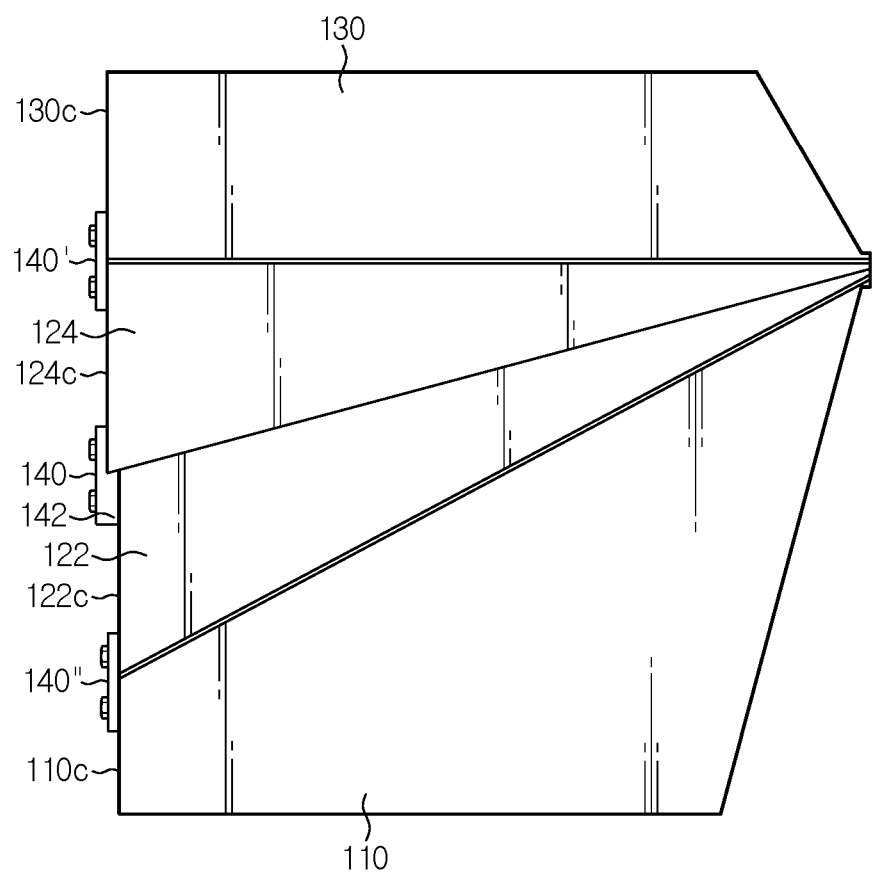

In FIG. 23, the location at which the step is formed between the rear surface of the upper die B and the rear surface of the lower die A is the same as that of the multi-slot die coater 100' of FIG. 17, but the step portion 142 of the fixing block 140 is in close contact with the rear surface 120c of the first intermediate die block 122, not the rear surface 124c of the second intermediate die block 124.

When the step is formed between the rear surfaces 124c, 122c of the two die blocks 124, 122, the step portion 142 of the fixing block 140 may be in close contact with the rear surface of any one of the two die blocks 124, 122. The die block having the rear surface in close contact with the step portion 142 moves forward to the substrate (see 300 of FIG. 17).

In this example, when the length of the upper die B is equal to the length of the lower die A, as opposed to FIG. 22, the lower exit port 101a moves further forward to the substrate 300 than the upper exit port 102a to form the step between the lower exit port 101a and the upper exit port 102a. In this instance, the lower die lip 111 on the downstream side in the movement direction of the substrate 300 is closer to the substrate 300 than the upper die lip 131 on the upstream side. Due to this feature, it is possible to uniformly adjust the thickness by applying pressure to the first coating solution 50 issuing from the lower exit port 101a by the lower die lip 111 and expanding the first coating solution 50 in the widthwise direction.

Figure 24:
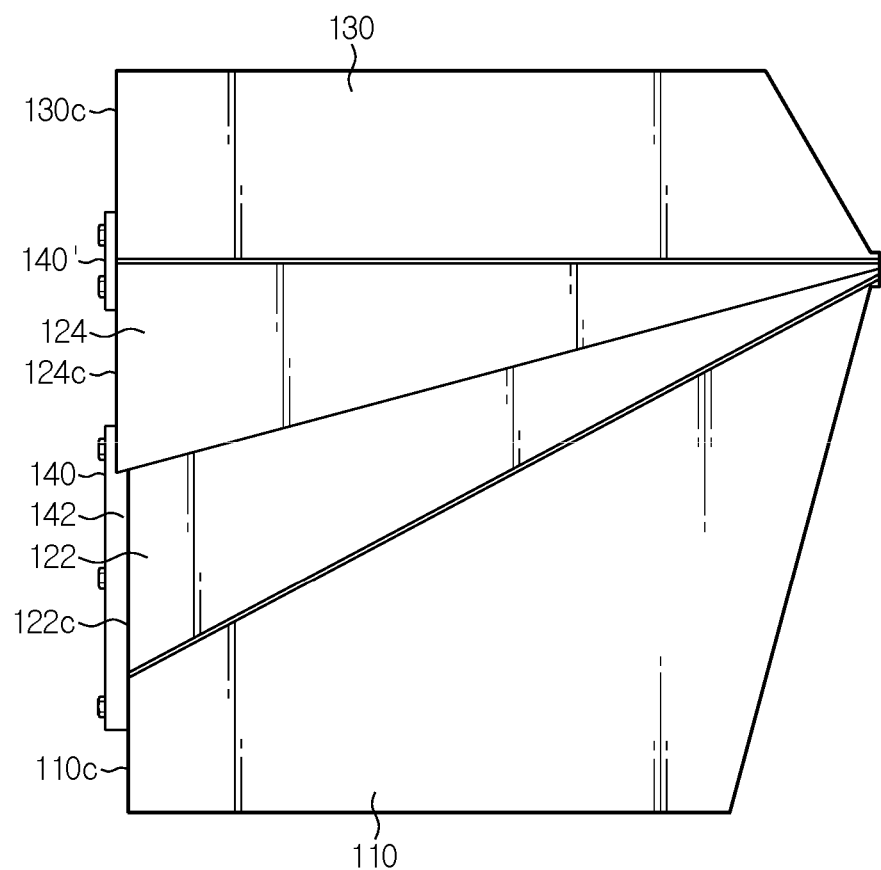

FIG. 24 is similar to FIG. 23, and is an embodiment showing that the fixing block 140 is simply extended to the rear surface 110c of the lower die block 110, and thus may be also coupled to the rear surface 110c of the lower die block 110. In this case, the step portion 142 is extended to the rear surface 110c of the lower die block 110.

Figure 25:
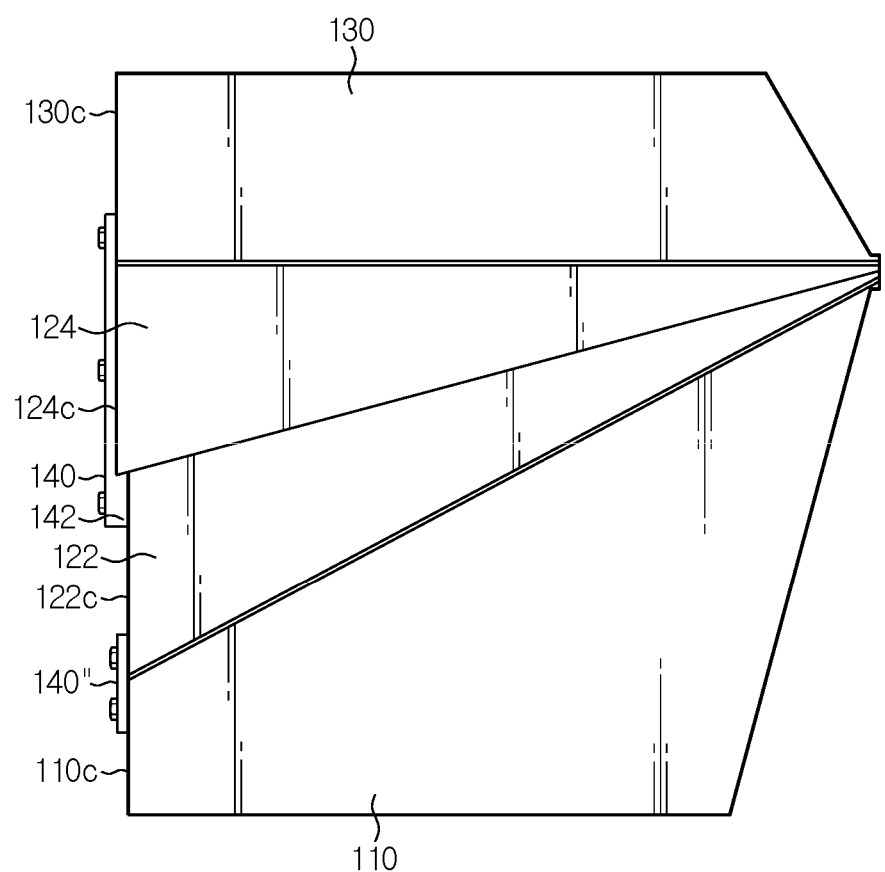

Additionally, FIG. 25 is similar to FIG. 23, and is an embodiment showing that the fixing block 140 is simply extended to the rear surface 130c of the upper die block 130, and thus may be also coupled to the rear surface 130c of the upper die block 130.

Figure 26:
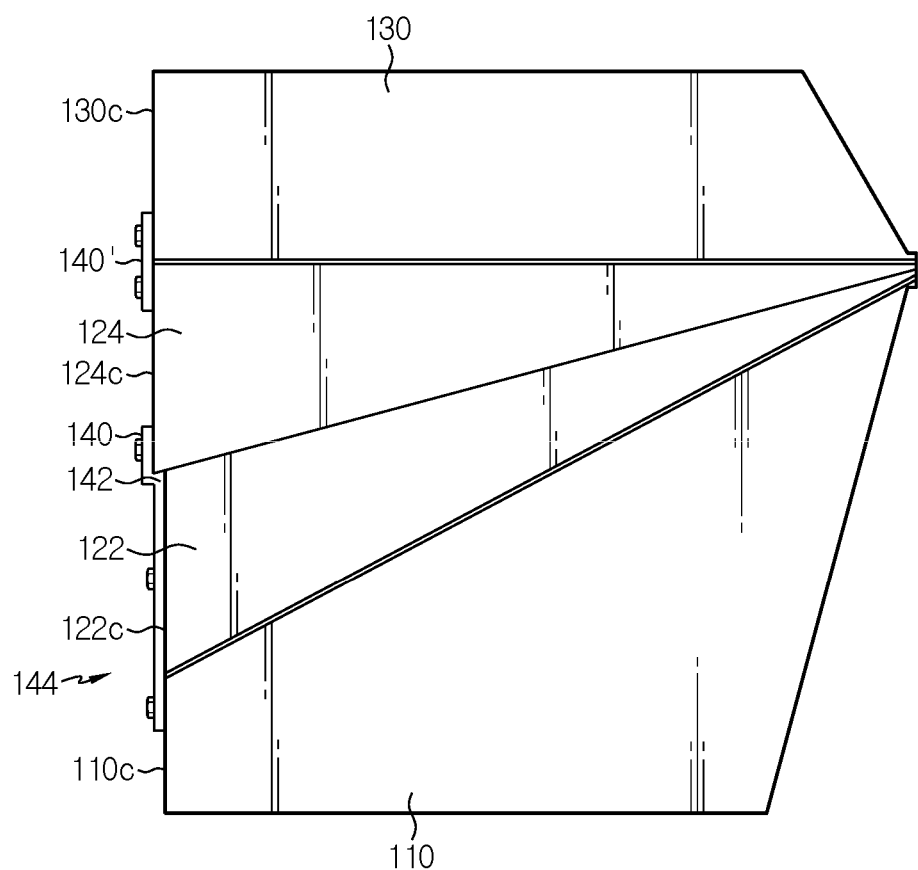

In the previous embodiments, the rear surface opposite the surface to which the rear surfaces 124c, 122c of the die blocks 124, 122 are coupled in the fixing block 140 is flat. However, as shown in FIG. 26, the step portion 144 recessed toward the front end may be further formed on the rear surface opposite the surface to which the rear surfaces 124c, 122c of the die blocks 124, 122 are coupled in the fixing block 140. As described above, the fixing block 140 is not limited to a particular shape when it has the step portion 142 and a structure for coupling each die block 130, 124, 122, 110 to support them.

Accordingly, when it is necessary to change the relative position between the lower exit port and the upper exit portion depending on the thickness of the active material layer coated on the current collector, the slot die coater 100' according to another embodiment of the present disclosure may simply adjust by the sliding movement of the lower die and/or the upper die, and as opposed to the conventional slot die coater, does not need to dissemble and re-assemble each die block, thereby significantly improving workability, and in particular, it is possible to set and maintain the step to have a desired coating gap through simple manipulation of fastening the fixing block 140.

While the present disclosure has been described with respect to a limited number of embodiments and drawings, the present disclosure is not limited thereto, and it will be apparent to those skilled in the art that a variety of changes and modifications may be made thereto within the technical aspects of the present disclosure and the appended claims and their equivalent scope.

Meanwhile, although terms indicating directions such as up, down, left, and right are used in the present specification, these terms are only for convenience of description, and it is apparent to those skilled in the art that these terms may be changed depending on a position of a target object or a position of an observer.

What is claimed is:

1. A multi-slot die coater comprising:
   a lower slot and an upper slot;
   a lower die block;
   an intermediate die block positioned on the lower die block such that the lower slot is formed between the intermediate die block and the lower die block; and
   an upper die block positioned on the intermediate die block such that the upper slot is formed between the upper die block and the intermediate die block,
   wherein the lower die block, the intermediate die block and the upper die block include a lower die lip, an intermediate die lip and an upper die lip that form front ends thereof, respectively,
   wherein the multi-slot die coater further comprises a fixing block on rear surfaces of the die blocks at a side opposite the front end, the fixing block bolted to the rear surfaces of at least the upper and intermediate die blocks to couple the at least the upper and intermediate die blocks, and
   wherein the fixing block includes a step portion which protrudes toward the front end with respect to a reference plane in contact with the rear surface of any one of the upper or intermediate die blocks and the step portion comes into contact with the rear surface of the upper die block or the rear surface of the intermediate die block, to form a step between the rear surface of the upper and intermediate die blocks which defines a uniform coating gap along a width direction of the multi-slot die coater relative to a substrate to be coated, and
   wherein the upper die lip or the intermediate lip are configured to extend beyond the lower die lip in a direction from the rear surface towards the front end.

2. The multi-slot die coater of claim 1 wherein the fixing block is extended to the rear surface of the lower die block, and thus the fixing block is also coupled the rear surface of the lower die block.

3. The multi-slot die coater of claim 1, which further comprises a planar plate-shaped fixing portion which is bolted to the rear surface of the intermediate die block and the rear surface of the lower die block.

4. The multi-slot die coater of claim 1, wherein the fixing block couples the intermediate die block to the lower die block, and the step portion comes into contact with the rear surface of the intermediate die block or the rear surface of the lower die block.

5. The multi-slot die coater of claim 4, wherein the fixing block is extended to the rear surface of the upper die block, and thus the fixing block is also coupled to the rear surface of the upper die block.

6. The multi-slot die coater of claim 4, further comprising a planar plate-shaped fixing portion which is bolted to the rear surface of the upper die block and the rear surface of the intermediate die block.

7. The multi-slot die coater of claim 1, wherein the fixing block couples the upper die block to the intermediate die block, the step portion comes into contact with the rear surface of the upper die block, and the upper die block is shorter in length than the intermediate die block and the lower die block.

8. The multi-slot die coater of claim 1, wherein a plurality of fixing blocks is provided in a widthwise direction of the multi-slot die coater.

9. The multi-slot die coater of claim 1, wherein a cross section running across the step portion and the reference plane in the fixing block includes a first cross section portion and a second cross section portion extending perpendicular to the first cross section portion.

10. A multi-slot die coater, comprising:
a lower die including a lower slot, and an upper die positioned on the lower die, the upper die including an upper slot,
wherein a planar surface formed on the lower die and a second planar surface formed below the upper die contact each other to form a sliding surface, and the upper die and the lower die are installed such that any one of the upper die and the lower die can slide along the sliding surface to make relative movement in a horizontal direction,
the multi-slot die coater further comprises a fixing block on rear surfaces on a side opposite a front end of the lower die and the upper die, the fixing block bolted to the rear surfaces of the lower die and the upper die to couple the lower die to the upper die, and
the fixing block includes a step portion which protrudes toward the front end with respect to a reference plane in contact with the rear surface of any one of the lower die and the upper die, and when the rear surface of the other die among the lower die and the upper die comes into contact with the step portion, a step is formed between the rear surfaces of the lower die and the upper die block coupled to the fixing block, which defines a uniform coating gap along a width direction of the multi-slot die coater relative to a substrate to be coated,
wherein the lower die block and the upper die block include a lower die lip and an upper die lip that form front ends thereof, respectively,
wherein the upper die lip is configured to extend beyond the lower die lip in a direction from the rear surface towards the front end.

11. The multi-slot die coater of claim 10, wherein the lower die includes a lower die block, and a first intermediate die block positioned on the lower die block such that a lower slot is formed between the first intermediate die block and the lower die block, and
the upper die includes a second intermediate die block installed on the first intermediate die block, and an upper die block positioned on the second intermediate die block, such that an upper slot is formed between the upper die block and the second intermediate die block.

12. The multi-slot die coater of claim 11, wherein the fixing block couples the first intermediate die block to the second intermediate die block, and the step portion comes into contact with the rear surface of the second intermediate die block or the rear surface of the first intermediate die block.

13. The multi-slot die coater of claim 12, wherein the fixing block is extended to the rear surface of the lower die block and thus the fixing block is also coupled to the rear surface of the lower die block.

14. The multi-slot die coater of claim 12, wherein the fixing block is extended to the rear surface of the upper die block and thus the fixing block is also coupled to the rear surface of the upper die block.

15. The multi-slot die coater of claim 12, further comprising a planar plate-shaped fixing portion which is bolted to the rear surface of the upper die block and the rear surface of the second intermediate die block or a planar plate-shaped fixing portion which is bolted to the rear surface of the first intermediate die block and the rear surface of the lower die block.

16. The multi-slot die coater of claim 11, wherein the step portion comes into contact with the rear surface of the second intermediate die block, and the upper die is shorter in length than the lower die.

\* \* \* \* \*